US006311237B1

(12) United States Patent
Suzuki et al.

(10) Patent No.: US 6,311,237 B1
(45) Date of Patent: Oct. 30, 2001

(54) SYSTEM INCLUDING SINGLE HOST BUFFER FOR TRANSMIT AND RECEIVE DATA AND RECEPTION BUFFER IN INTERFACE DEVICE HAVING STAND-BY AREA FOR USE BY HOST BUFFER WHEN ABNORMAL STATE IS DETECTED

(75) Inventors: Noriyuki Suzuki; Hisatsugu Naito, both of Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/218,415

(22) Filed: Dec. 29, 1998

(30) Foreign Application Priority Data

Jan. 5, 1998 (JP) .................................................. 10-000396
May 19, 1998 (JP) .................................................. 10-137189

(51) Int. Cl.[7] .............................. G06F 13/14; G06F 13/20
(52) U.S. Cl. .............................. 710/52; 710/15; 710/19; 710/33; 710/55; 710/56; 711/147; 711/170
(58) Field of Search .................................. 710/15, 19, 33, 710/52, 55, 56; 711/147, 170

(56) References Cited

U.S. PATENT DOCUMENTS

| | | | |
|---|---|---|---|
| 5,412,801 | * | 5/1995 | De Remer et al. .................. 395/575 |
| 5,787,308 | | 7/1998 | Suzuki et al. ........................ 395/839 |
| 5,926,650 | | 7/1999 | Suzuki et al. ........................ 395/834 |
| 5,930,358 | * | 7/1999 | Rao ............................................ 380/4 |
| 5,930,467 | * | 7/1999 | Morita .................................. 395/115 |
| 6,031,976 | * | 2/2000 | Koakutsu et al. ..................... 395/115 |
| 6,094,695 | * | 7/2000 | Kornher ................................... 710/56 |

FOREIGN PATENT DOCUMENTS 8-221250   8/1996   (JP) .
9-34596    2/1997   (JP) .

* cited by examiner

*Primary Examiner*—Thomas Lee
*Assistant Examiner*—Rehana Perveen
(74) *Attorney, Agent, or Firm*—Fitzpatrick, Cella, Harper & Scinto

(57) ABSTRACT

In the event that a host device does not have a transmitting FIFO and receiving FIFO independently, but shares one FIFO for both transmission and reception, and an error occurs at the destination of transmission, the host cannot receive error information unless the FIFO is emptied. Accordingly, the printer according to the present invention secures a stand-by area in the reception buffer that is the same capacity as the FIFO at the host. In the event that an error occurs, transmission of data from the host is stopped, and if there is no available area except for the stand-by area within the reception buffer, the stand-by area is released to empty the FIFO.

21 Claims, 22 Drawing Sheets

SYSTEM INCLUDING SINGLE HOST BUFFER FOR TRANSMIT AND RECEIVE DATA AND RECEPTION BUFFER IN INTERFACE DEVICE HAVING STAND-BY AREA FOR USE BY HOST BUFFER WHEN ABNORMAL STATE IS DETECTED

BACKGROUND OF THE INVENTION

1. Field of the Invention

The present invention relates to an interface device ideal for peripheral devices such as printer devices or the like, a control method, and a printing device using the same.

2. Description of the Related Art

It is well known that parallel interfaces according to the specifications of Centronics (hereafter referred to as "Centronics Interface") are widely used for transmitting data between a host device such as a personal computer and peripheral devices such as printers or the like. Further, at the present, bidirectional parallel interface standards with upward compatibility with the Centronics Interface have been stipulated by IEEE (IEEE Std. 1284-1994 "Standard Signaling Method for a bi-directional Parallel Peripheral Interface for Personal Computer"; hereafter referred to as "IEEE 1284").

Bi-directional communication can provide the user with an even more easy-to-use environment, since the state of operation of peripheral equipment such as printer devices and the like can be supervised from the host device. Moreover, not only is ease of use facilitated, but operating panels to notify the state of operation of peripheral equipment or issue work commands can be simplified, thereby providing devices at lower prices.

Now, a configuration example of a printer device having a Centronics Interface is disclosed in Japanese Provisional Patent Publication (KOKAI) No. 8-221250. According to the description in Japanese Provisional Patent Publication (KOKAI) No. 8-221250, the data sent from the host device is temporarily stored in a ring buffer. The data stored in the ring buffer is sequentially read in accompaniment with the printing recording operation of the printer device in the order in which the data has been stored, but in the event that $$\text{Transfer speed of the data (reception speed)} > \text{Speed at which data is read from ring buffer} \quad (1)$$

holds, data continues to pile up in the ring buffer. In this case, at the point that the remaining available capacity of the ring buffer drops below a certain amount, i.e., when the buffer is full, the printer device asserts a busy signal, so as to suppress any further data transfer from the host device. When the data is further read and the remaining available capacity of the ring buffer recovers to a certain amount, the busy signal is negated, and transmission of data from the host device is resumed.

Also, in the event that an abnormal state occurs, such as depletion of ink or recording paper, the printer device goes off-line, a busy signal is asserted so as to suppress any further data transfer from the host device. The abnormal state is manually corrected by the user, following which the user presses an on-line key, whereby the busy signal is negated, and transmission of data from the host device is resumed.

The above is a description of an arrangement in a compatible mode with a Centronics Interface, i.e., an IEEE 1284 interface, but there is basically no difference in operation in the case of the ECP mode, and transfer of data from the host device is suppressed in the event of a full buffer or an abnormal state (suppression of data transfer when in the ECP mode can be carried out by not executing Event 36 stipulated in IEEE 1284 at the printer device).

On the other hand, as disclosed in Japanese Provisional Patent Publication (KOKAI) No. 9-34596, mainstream arrangements for present-day personal computers involve I/O circuits for keyboards, serial ports, secondary storage devices, etc., to be configured of around one or two chip sets.

Such chip sets for personal computers are commercially available from several semiconductor manufacturers. For example, a chip called PC87303VUL manufactured by USA corporation National Semiconductor bundles circuitry for an IEEE 1284 parallel port, serial port, floppy disk drive controller, IDE hard drive controller, keyboard controller, real-time clock, etc., within a single chip.

Now, it is often the case that the IEEE 1284 parallel port circuit of such a chip set has a FIFO for both transmission and reception. Since this serves for both transmission and reception, the transmission and reception operation cannot be switched from one to another until the FIFO is empty (while switching of the transmission/reception operation may be force-executed, there is no choice in such a case but to clear the data rem-ining in the FIFO).

With an IEEE 1284 interface employed, in the event that there is some sort of abnormal state occurring at the printer device, detailed conditions are notified to the personal computer by means of reverse transfer in ECP mode or by nibble mode. Of course, the IEEE 1284 parallel port circuit in the above chip set executes reception action at this time.

However, abnormal states at the printer occur at completely random timing. Accordingly, in the event that data transfer from the personal computer is immediately suppressed and stopped, data is left within the FIFO in the above chip set without being transferred, so transmission and reception cannot be switched, and consequently notification of the abnormal state cannot be executed.

In the event that there is sufficient available capacity remaining in the ring buffer at the printer device, the FIFO can be emptied by suppressing the data transfer in a somewhat delayed manner, rather than immediately. However, such an arrangement cannot deal at all with occurrences of abnormal states with the buffer full. That is, with the known technique, bidirectional communication may not function properly depending on the circumstances, even if an bi-direction IEEE 1284 interface is employed.

This problem can be fundamentally solved by having independent FIFOs for transmission and reception, instead of one for both transmission and reception. Of course, it is technologically feasible to manufacture chip sets with such a configuration and manufacture personal computers using such chip sets.

However, such means for solving the problem does nothing for the millions of personal computers already on the market and in use.

SUMMARY OF THE INVENTION

The present invention has been made in light of the above problems with the known art, and it is an object thereof to provide an interface device, a control method, and a printing device, whereby bi-directional communication can be made to properly function without making any hardware changes to the personal computer, but rather solely devising an arrangement on the side of the peripheral devices.

In order to achieve the above object, the interface device according to the present invention secures an available capacity area in the reception buffer matching the capacity of the FIFO on the host side, and in the event that data to be sent to the host is generated, data transfer from the host is suppressed. At this time, all the data in the FIFO at the host is transmitted by releasing the aforementioned available area. Thus, the host device can receive the data using the now-empty FIFO.

Further, in the event that the remaining available capacity of the reception buffer drops below a certain value, the reception speed is delayed so as to purchase time for processing the received data. Moreover, in this case, in the event that data to be sent to the host is generated, transfer of data from the host is stopped, and the reception speed is restored to the original speed to quickly transmit the data within the FIFO. The available area secured in the reception buffer is released for reception of this data.

The present invention is configured as follows.

An interface device connected to a host device which sends and receives data via a buffer serving as both a transmission and reception buffer comprises: receiving means for receiving data transmitted by the host device; a reception-buffer for storing received data, the reception buffer to be used according to certain commands and having a stand-by area secured that has capacity equal to or greater than that of the buffer of the host device; and control means for stopping the transmission of data from the host device and issuing a command to use the stand-by area, in the event that data to be transmitted to the host device is generated.

Also, preferably, the control means further judges whether or not the reception buffer is full except for the stand-by area in the event that data to be transmitted to the host device is generated, and in the event that the reception buffer is judged to be full, stops the transmission of data from the host device and issues a command to use the stand-by area.

Also, preferably, the interface device further comprises a sensor for detecting abnormal states, wherein the "event that data to be transmitted to the host device is generated" includes cases in which an abnormal state is detected by the sensor.

Also, preferably, the interface device further comprises speed-lowering means for lowering the reception speed by the receiving means, wherein the control means lowers the reception speed in the event that an abnormal state is detected by the sensor.

Also, preferably, the interface device further comprises speed-lowering means for lowering the reception speed by the receiving means, wherein the control means lowers the reception speed in the event that an abnormal state is detected by the sensor and the reception buffer is full.

Also, preferably, the receiving means exchanges with the host device signals conforming to IEEE 1284 stipulations.

Also, preferably, the interface device further comprises setting means for setting the stand-by capacity.

Also, preferably, the interface device further comprises speed-lowering means for lowering the reception speed by the receiving means, wherein the control means lowers the reception speed of data in the event that the available capacity of the reception buffer is equal to or less than a certain value which is greater than the stand-by capacity, and restores the reception speed of data to the original speed in the event that data to be transmitted to the host device is generated.

Also, preferably, the interface device further comprises speed-lowering means for lowering the reception speed by the receiving means, wherein the control means lowers the reception speed of data in the event that the available capacity of the reception buffer is equal to or less than a certain value which is greater than the stand-by capacity, and restores the reception speed of data to the original speed after a certain amount of time elapses.

Also, preferably, the certain value is the capacity regarding which can data can be received and stored at the delayed reception speed during the longest period during which the interface device cannot execute reception processing.

Also, preferably, the present invention comprises a printing device connected to a host device by means of the above-described interface devices, wherein the printing device prints images based on the data received via the interface device.

Other features and advantages of the present invention will be apparent from the following description taken in conjunction with the accompanying drawings, in which like reference characters designate the same or similar parts through the Figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

First Embodiment

Figure 1:
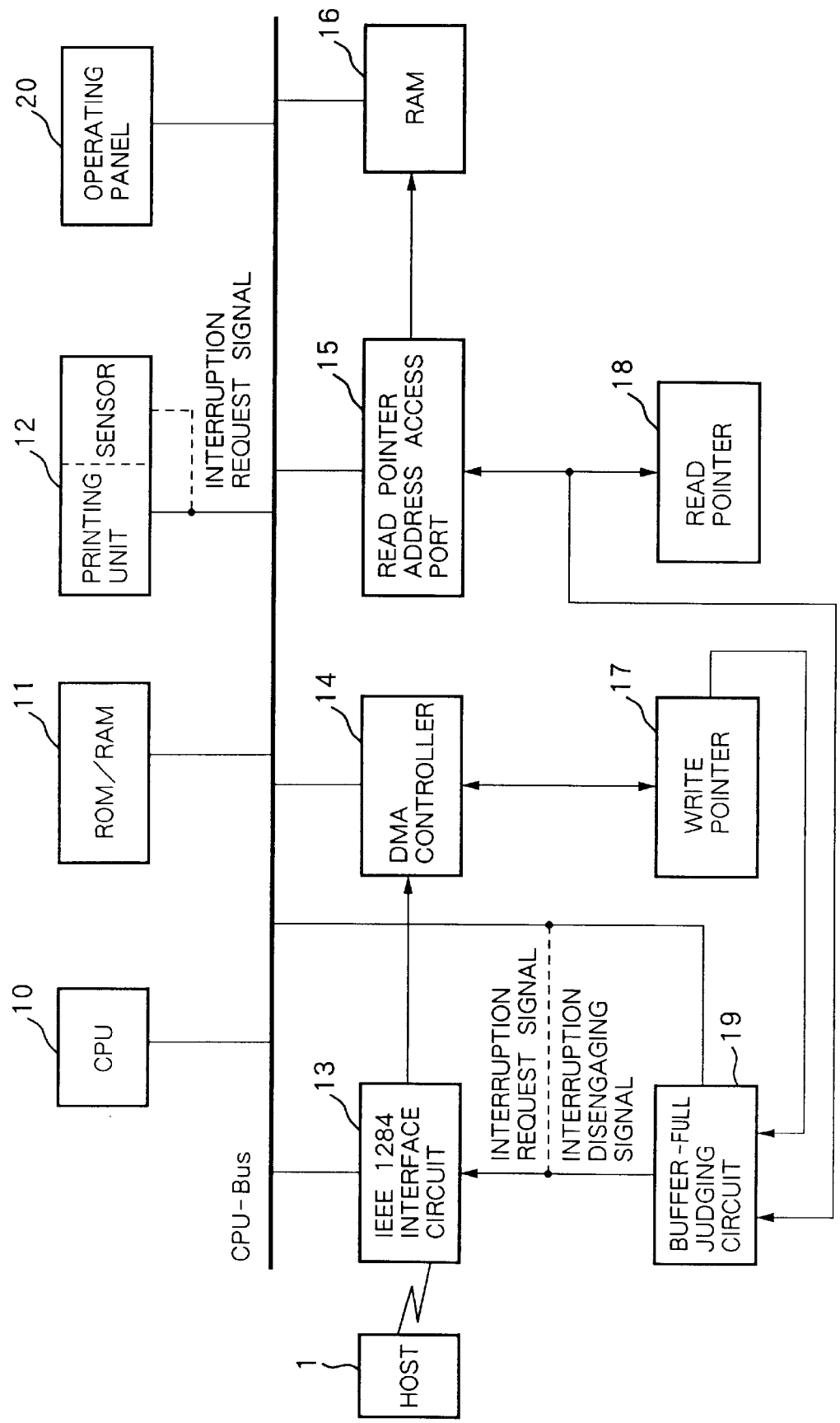
FIG. 1 is a configuration drawing of a printer device carrying out the present invention.

Description will be made regarding the first embodiment of the present invention. FIG. 1 is a block diagram of a printer device having the interface device which carries out the present embodiment. In the Figure, the CPU 10 controls the overall printer device. Of the ROM/RAM 11, program data, font data, etc. is stored in the ROM section, and the RAM portion is used as work area for various jobs, as well as serving as a printing buffer. The printing unit 12 is comprised of a motor and printing head, circuits for driving these, and so forth. Also, various sensors are provided to the printing unit 12, so as to output interruption request signals for abnormal states such as depletion of ink or printing paper, or trouble in the transporting of printing paper (so-called jamming). The IEEE 1284 interface circuit 13 has enclosed therein a data transfer suppressing circuit for suppressing the transfer of data from an unshown host, based on later-described buffer-full signals or commands from the CPU 10. This data transfer suppression is carried out in the ECP mode by placing execution of Event 36 on hold, by means of asserting a busy signal. Also, with the IEEE 1284 interface circuit 13, nFault signals or nPeriphRequest signals can be arbitrarily asserted or negated based on commands from the CPU 10, when communicating in the compatible mode or ECP mode. Also, the FD 21 is a detachable storage medium such as a floppy disk drive or the like, for supplying data, programs, etc., externally. This may be a ROM cassette, etc., or any sort of storage medium, so long as data exchange can be made. In the event that data exchange is not necessary, the detachable storage medium does no necessarily need to be provided.

RAM 16 is used as a reception buffer. In FIG. 1, a RAM device is provided to both the ROM/RAM 11 and RAM 16, but in the case of configuring a system using only a single RAM device unit, the ROM/RAM 11 may be provided without RAM, so as to use RAM 16 alone. In this case, part of the RAM 16 is used as a reception buffer, and other portions thereof are used as work areas for various jobs. When transferred data reaches the IEEE 1284 interface circuit 13 from the host device 1, the CMA controller 14 executes DMA transfer of this transfer data to the RAM 16. When all the data necessary is accumulated in the printing buffer portion of the ROM/RAM 11, this is also used to executes DMA transfer of this data to the printing head (not shown) of the printing unit 12.

The write pointer 17 and read pointer 18 are each comprised of counter circuits and the like. DMA transfer is executed to the address which the write pointer value points to. Also, the configuration is such that the write pointer value decreases by a value of 1 each time that CMA transfer of the transfer data is performed. In the event that the write pointer exceeds the reception buffer area as a result of the decremented pointer value, the address to which it points returns to the leading address.

When the CPU 10 reads the read pointer address access port 15, an address signal of the location indicated by the read pointer value is output to the RAM 16. In other words, the arrangement is such that reading this port enables intake of data from the reception buffer.

Further, the arrangement is such that each time the CPU 10 reads the read pointer address access port 15, the read pointer value decreases by a value of 1. In the event that the read pointer exceeds reception buffer area as a result of the decrementing, the address to which it points returns to the leading address or the reception buffer. Thus, the write pointer 17 and the read pointer 18 cooperatively comprise a so-called ring buffer. Incidentally, the arrangement is such that the values of the write pointer 17 and the read pointer 18 can be arbitrarily initialized by the CPU when performing start-up of the device.

In order to prevent overflow of the reception buffer, the buffer-full judging circuit 19 calculates the available capacity remaining in the reception buffer from the values of the write pointer 17 and the read pointer 18, and in the event that the available capacity is equal to or less than a certain value, outputs a buffer-full signal to the IEEE 1284 interface circuit 13. Upon receiving output of the buffer-full signal, the IEEE 1284 interface circuit 13 executes an operation of suppressing transfer of data from the host device. After reading of data from the reception buffer has progressed and the available capacity remaining in the reception buffer recovers to a certain value, the buffer-full signal is no longer output, and suppression of the data transfer is disengaged. Details will be described later, but the buffer-full judging circuit 19 performs buffer-full judgment twice with two differing reception buffer remaining amount values. Also, buffer signals and the inversion signals thereof are also output as interruption request signals to the CPU 10, so that the CPU 10 can be notified of a full buffer or disengaging of the buffer-full state. The operating panel 20 is comprised of keys such as a power key and resume key, and LEDs for status display and the like. The resume key is a switched for restoring the state from that wherein communication with the host is not possible (off-line state) to that in which communication with the host is can be made (on-line state).

<Buffer-full judging circuit>

Figure 2:
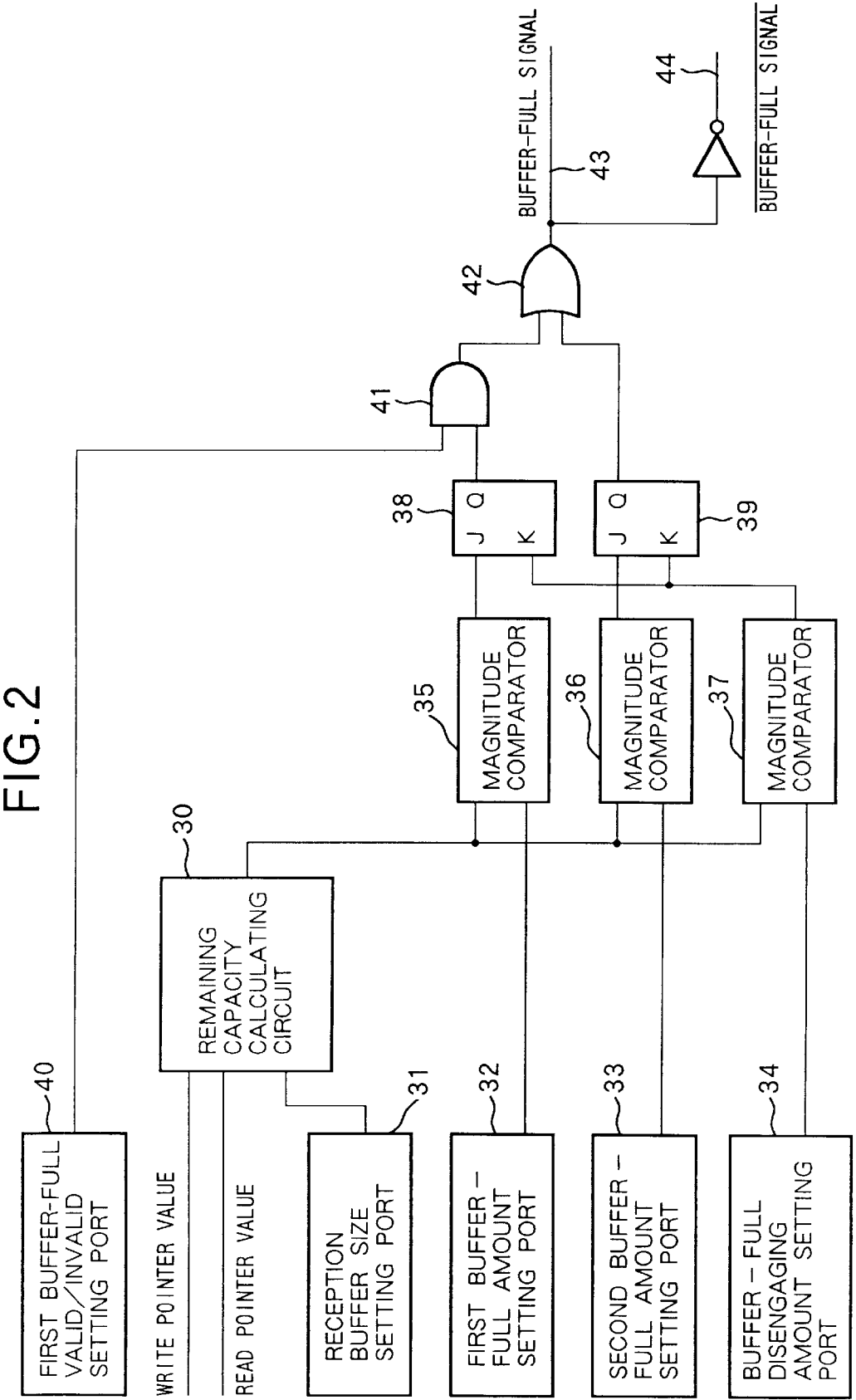
FIG. 2 is a configuration drawing of a buffer-full judging circuit.

FIG. 2 is a block diagram illustrating the detailed configuration of the buffer-full judging circuit 19. In the Figure, the remaining capacity calculating circuit 30 calculates the available capacity remaining in the reception buffer, based on the write pointer value, the read pointer value, and the overall capacity value of the reception buffer set to the reception buffer size setting port 31 by the CPU 10. The remaining capacity value can be calculated according to the following expressions:

If (write pointer value>read pointer value) Write pointer value−read pointer value  (2)

If (write pointer value≦read pointer value) Write pointer value−read pointer value+total capacity value of reception buffer  (3)

The first buffer-full amount setting port 32 has set therein a remaining capacity value for making the first buffer-full judgment based on commands from the CPU 10. This set value and the actual remaining capacity value output from the remaining capacity calculating circuit 30 are compared in the magnitude comparator 35, and in the event that $$\text{First buffer-full amount setting value} \geq \text{value of capacity remaining in reception buffer} \quad (4)$$

holds, a set signal is output to the J terminal of the JK flip-flop 38.

The second buffer-full amount setting port 33 has set therein a remaining capacity value for making the second buffer-full judgment based on commands from the CPU 10. This set value and the actual remaining capacity value output from the remaining capacity calculating circuit 30 are compared in the magnitude comparator 35, and in the event that $$\text{Second buffer-full amount setting value} \geq \text{value of capacity remaining in reception buffer} \quad (5)$$

holds, a set signal is output to the J terminal of the JK flip-flop 39.

The buffer-full disengaging amount setting port 34 has set therein a remaining capacity value for making buffer-full disengagement judgment based on commands from the CPU 10. This set value and the actual remaining capacity value output from the remaining capacity calculating circuit 30 are compared in the magnitude comparator 35, and in the event that $$\text{Buffer-full disengaging amount setting value} < \text{value of capacity remaining in reception buffer} \quad (6)$$

holds, a reset signal is output to the K terminals of the JK flip-flops 38 and 39.

The logical sum of the output signals from the JK flip-flops 38 and 39 is obtained at the OR device 42, and the logical sum signal is output to the IEEE 1284 interface circuit 13. However, the output signal of the JK flip-flop 38 is masked by the output signal of the first buffer-full valid/invalid setting port 40 by means of the AND device 41. The valid/invalid output of the first buffer-full valid/invalid setting port 40 can be set arbitrarily by the CPU 10, with Hi and Low signals being output corresponding with valid/invalid settings, respectively.

The setting value of the first buffer-full amount and the setting value of the second buffer-full amount are set so that $$\text{Setting value of first buffer-full amount} > \text{setting value of second buffer-full amount} \geq 1[\text{byte}] \quad (7)$$

holds. Accordingly, first, judgment is made according to the first buffer-full amount and transfer of data from the host device is suppressed. However, if necessary, the buffer-full judgment at the first buffer-full amount can be nullified. In this case, suppression of the data transfer is temporarily disengaged, and the reception operation is continued until the remaining amount of the reception buffer reaches the second buffer-full amount.

Then, even in the event that the buffer has become full for both the first and second buffer-full amounts, once the remaining amount of the reception buffer is restored to the buffer-full disengaging amount, the suppression of the data transfer is disengaged and the reception operation is resumed.

Also, while not shown in FIG. 2, the output signals of the JK flip-flops 38 and 39 can be read by the CPU 10, so as to recognize whether or not there is currently a buffer-full state at the first or second buffer-full amount. To this end, these flip-flops are allocated to memory or I/O addresses. Further, the arrangement is such that the JK flip-flops 38 and 39 can be initialized from the CPU 10 at the time of start-up of the device.

<Judgment of the buffer-full state>

Next, description will be made regarding the circumstances under which the buffer-full judgment at the first buffer-full amount is nullified, with reference to the flowcharts shown in FIGS. 3 through 6. The steps in these flowcharts are realized by means of executing certain programs stored in the ROM/RAM 11 by the CPU 1 shown in FIG. 1.

Figure 3:
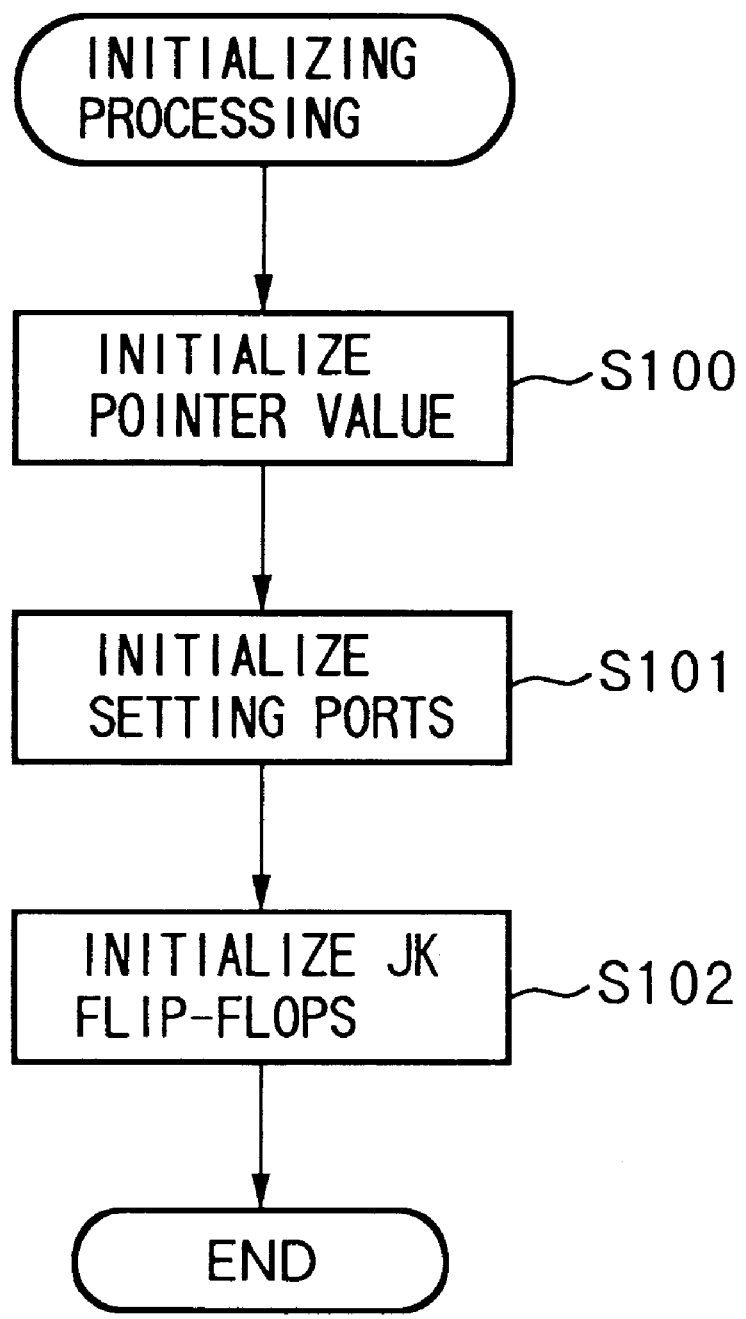
FIG. 3 is a flowchart for interruption processing.

FIG. 3 is a flowchart for the initializing process. After turning on the electrical power, first, in Step 100, the values of the write pointer and read pointer are initialized. For example, the overall capacity value for the reception buffer is set to 256 kbytes, the first buffer-full amount is set to 12 kbytes, the second buffer-full amount is set to 64 bytes, and the buffer-full disengaging amount is set to 24 kbytes. Next, in Step 102, the JK flip-flops 38 and 39 are initialized.

Although the operations following the above initializing process are not shown, the printer device according to the present embodiment carries out normal operations as a printer.

Figure 4:
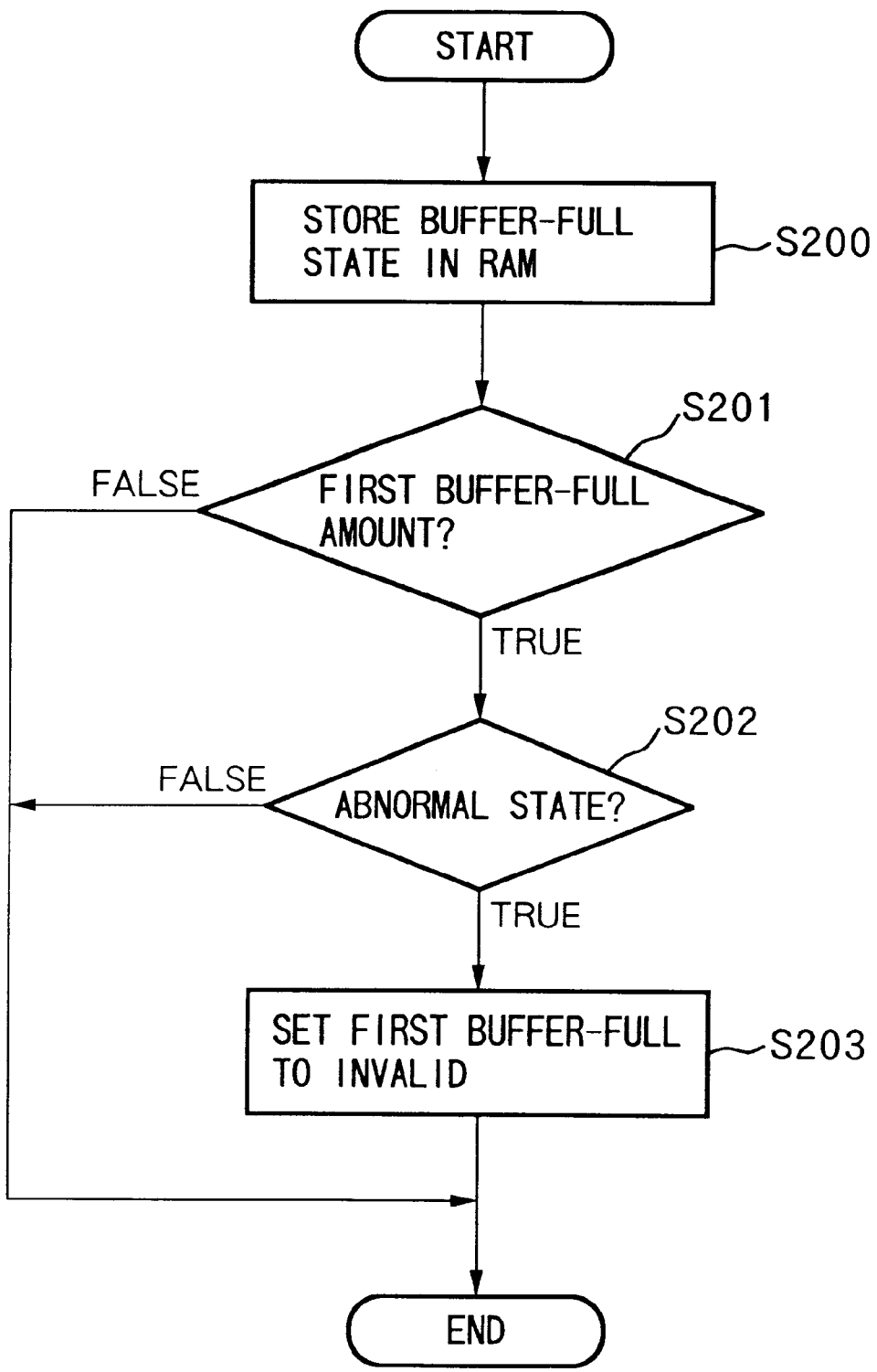
FIG. 4 is a flowchart for interruption processing.

FIG. 4 is a flowchart for interruption processing to be executed in the case that a buffer-full interruption request signal according to the buffer-full signal 43 shown in FIG. 2 reaches the CPU 10. In Step 200, the fact that the buffer has become full is stored in the work area of the RAM portion of the ROM/RAM 11. Incidentally, accepting other interruption signals is forbidden while processing Step 200. Next, in Step 201, judgment is made whether the buffer-full state is a buffer-full state at the first buffer-full amount or a buffer-full state at the second buffer-full amount. Which is true can be judged according to the output signals of the JK flip-flops 38 and 39. In the event that the buffer-full state is a buffer-full state at the second buffer-full amount, the interruption process is ended without any further action.

Next, in Step 202, judgment is made regarding whether or not an abnormal state has occurred at the printer device. In the event that an abnormal state has not occurred at the printer device, the interruption process is ended without any further action. In the event that an abnormal state has occurred, the first buffer-full valid/invalid setting is set to invalid in Step 203.

Figure 5:
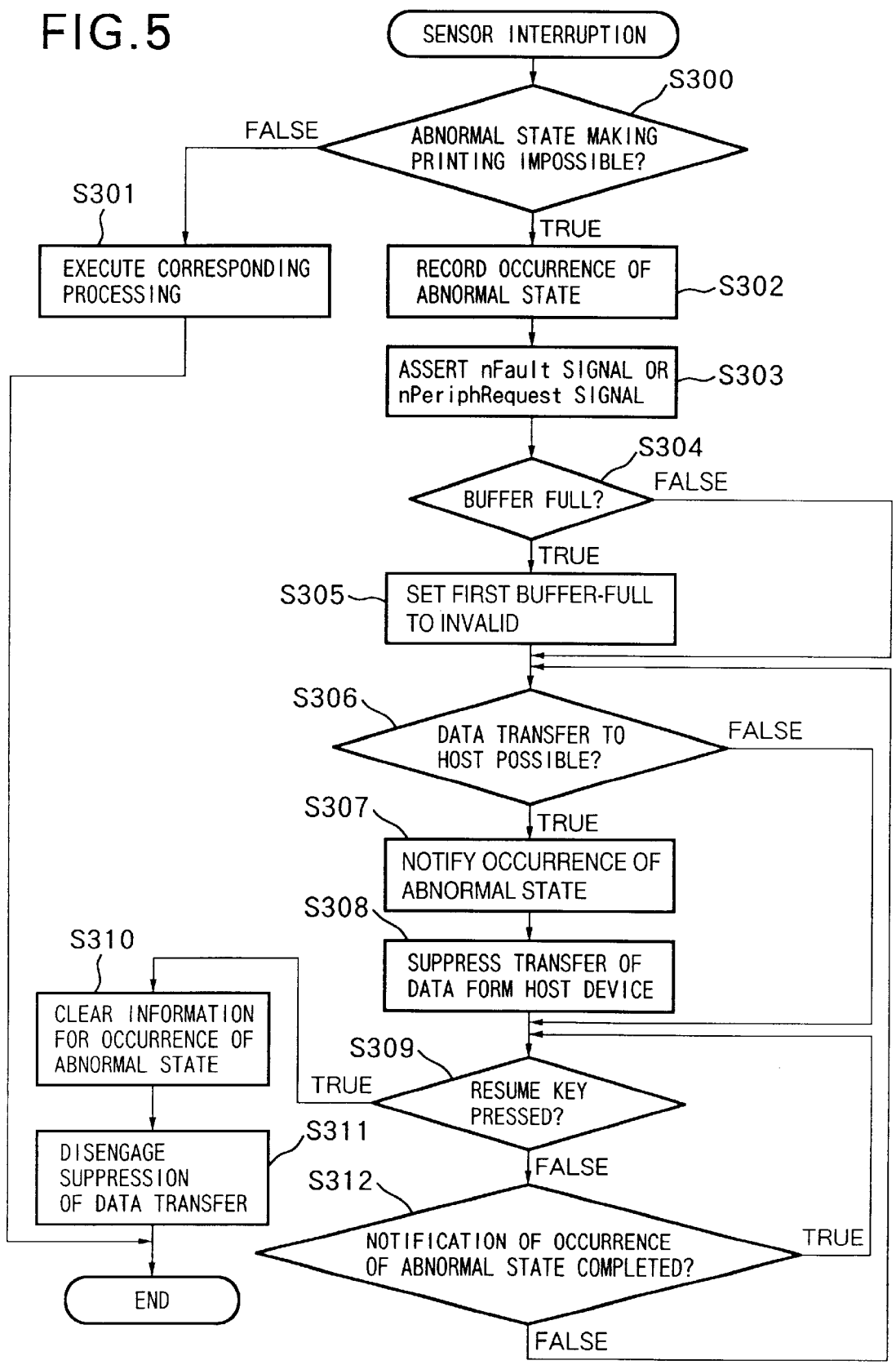
FIG. 5 is a flowchart for interruption processing.

FIG. 5 is a flowchart for interruption processing to be executed in the case that a buffer-full interruption request signal from the printing unit 12 reaches the CPU 10.

First, in Step 300, judgment is made whether an abnormal state has occurred that would make printing operations impossible to continue. In the event that there is no abnormal state, processing is executed to the sensor signal in Step 301, and the interruption process is ended. On the other hand, in the event that an abnormal state has occurred in Step 302, the fact that an abnormal state has occurred is stored in the work area of the RAM portion of the ROM/RAM 11. Judgment of whether an abnormal state has occurred or not in Step 202 of FIG. 2 is made based on information stored in the work area, as a matter of fact. Incidentally, accepting other interruption signals is forbidden while processing Step 302. Then, in Step 303, in order to notify the host device that an abnormal state has occurred, an nFault signal is asserted when in the compatible mode, or when in the ECP mode an nPeriphRequest signal is asserted. These signals are both stipulated by IEEE 1284.

Next, in Step 304, judgment is made whether the state is a buffer-full state or not. This judgment is made based on the information stored in the work area in Step 200. In the event that the buffer is full, the first buffer-full valid/invalid setting is set to invalid in Step 305. In the event that it is judged in Step 306 that data can be transferred from the printer device to the host device by nibble mode or ECP mode reverse transfer, the host is notified of an abnormal state in Step 307. Following the transmission for this notification, the nFault signal or nPeriphRequest signal asserted in Step 303 is negated in Step 308, and further, data transfer from the host is suppressed by commands from the CPU 10. To this end, a busy signal is asserted in the case of the compatible mode, for example. At this stage, the printer enters the off-line state.

In the event that judgment in Step 306 finds that the host device is not permitting reverse data transfer, i.e., data transfer from the printer to the host, the flow proceeds to Step 309 with no action taken.

In Step 309, judgment is made whether or not the resume key on the operating panel 20 has been pressed for restoring from the off-line state. In the event that the resume key has been pressed, the flow proceeds to Step 310, and clears the information regarding the abnormal state stored in Step 302. Incidentally, accepting other interruption signals is forbidden while processing Step 310. Then, in Step 311, suppression of data transfer according to commands from the CPU 10 is disengaged, thus ending the interruption process. For example, in the compatible mode, in the event that a busy signal was asserted in Step 308, that is negated to disengage suppression of data transfer.

In the event that the resume key is not pressed yet, i.e., in the event that disengagement of the off-line state has not been instructed, the flow proceeds to Step 312. In Step 312, judgment is made whether or not notification of the occurrence of abnormal state to the host device has been completed or not. In the event that it has been completed, processing is picked up from Step 309, and in the event that it has not been completed, from Step 306.

Figure 6:
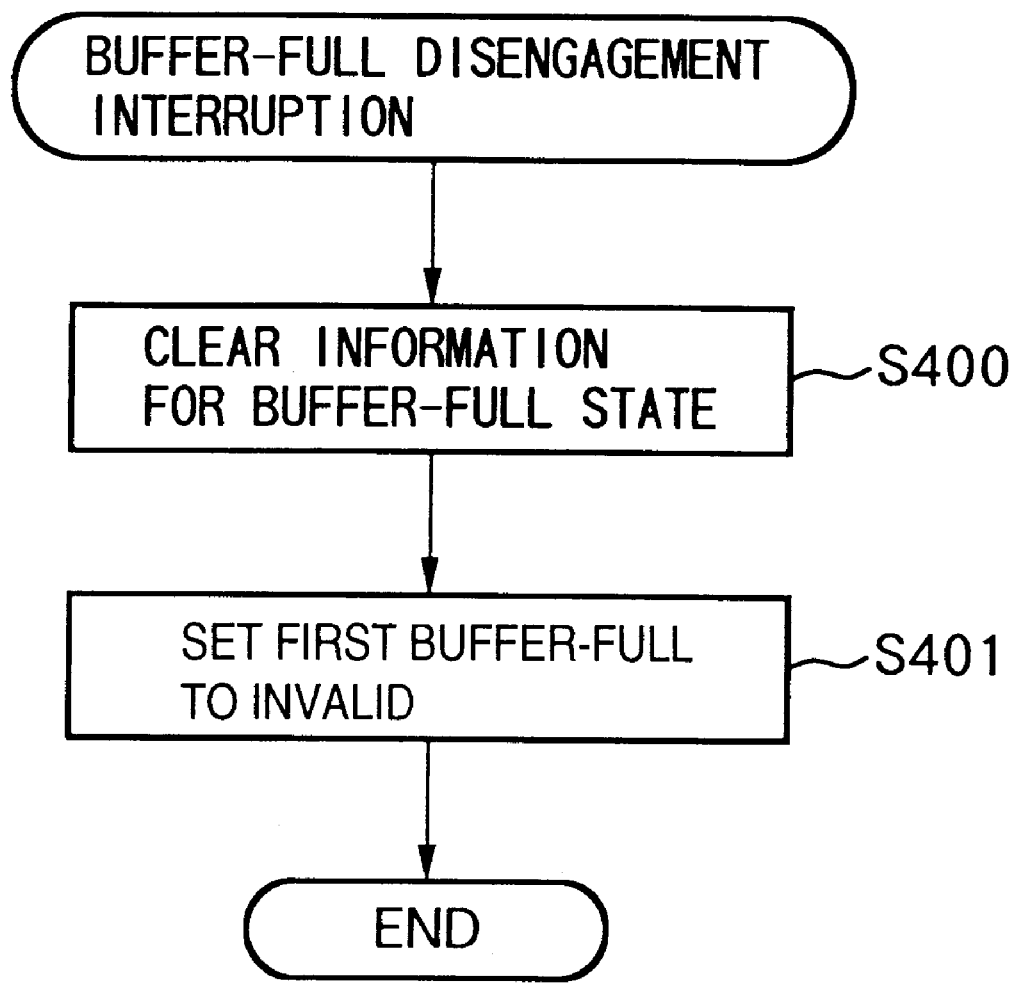
FIG. 6 is a flowchart for interruption processing.

FIG. 6 is a flowchart of interruption processing in the event that a interruption request signal for buffer-full disengagement reaches the CPU 10 by means of the buffer-full inverse signal 44 in FIG. 2. In Step 400, the buffer-full information stored in Step 200 is cleared. Next, in Step 401, the first buffer-full valid/invalid setting is set to valid.

Figure 7:
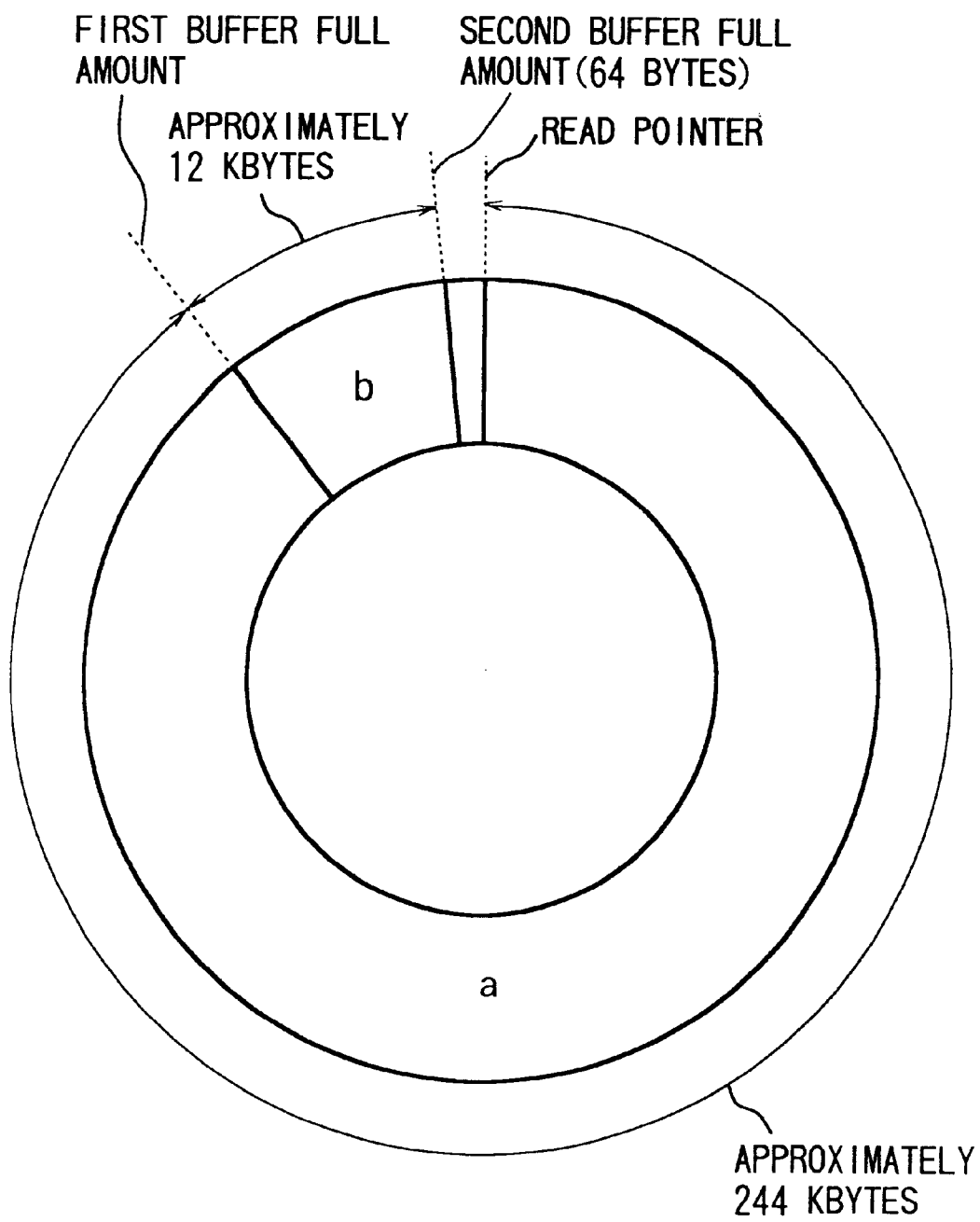
FIG. 7 is a type representation of a reception buffer.

By means of performing buffer-full/buffer-full disengagement processing whenever an abnormal state occurs, the following operational characteristics are manifested:
(1) Even if an abnormal state occurs at the printer, data transfer from the host device is not suppressed immediately.
(2) Suppression of data transfer is performed after the host device has been notified of the abnormal state.
(3) As shown in the type diagram of the reception buffer (the diagram is in a round shape, to represent a ring buffer) shown in FIG. 7, the 12 kbytes ("b" in the Figure) which is the amount obtained by subtracting the second buffer-full amount from the first buffer-full amount is used as the stand-by area, and approximately 244 kbytes ("a" in the Figure) from the top up to the first buffer-full amount is used in normal situations.
(4) When the area of 244 kbytes up to the first buffer-full amount is used up, this makes a buffer-full state, and transfer of data from the host device is suppressed. Normally, the flow waits for available area in the reception buffer to recover, and then the above data transfer suppression is disengaged.
(5) In the event that an abnormal state occurs when in the buffer-full state, or in the event that a buffer-full state occurs after an abnormal state has occurred, the buffer-full state based on the first buffer-full amount in (4) is disengaged (Step 305 in FIG. 5), and data is received into the above stand-by area.

Now, by means of making the size of the stand-by area "b" to be the same size as or greater than that of the FIFO of the chip set at the host, no un-transmitted data will remain in the FIFO of the chip set at the host. Accordingly, by means of suppressing data transfer from the host at the point that the first buffer-full state occurs, transfer of data from the host can be stopped without un-transmitted remaining in the FIFO of the chip set at the host. Thus, even if the host uses the FIFO for reception as well, data transfer can be made from the printer to the host, hence enabling constant bi-directional communication.

In this way, in cases where the host does not have a transmitting FIFO and receiving FIF independently, but shares one FIFO for both transmission and reception, data such as error information or the like which should be sent from the printer can be notified to the host by stopping transmission of data from the host without loosing any data in the FIFO.

Accordingly, a printer device can be provided which sufficiently makes use of the bidirectional functionality of the IEEE 1284 interface, even when combined with computers which are already on the market.

Also, since this technique does not violate already-existing protocols such as IEEE 1284, the same compatibility is maintained with the operations of the personal computers. That is, there is no need to change the operations of the personal computer to differentiate between connecting to a printer device which employs the present invention and connecting to a printer device which does not.

Incidentally, though Steps 304 and 305 in FIG. 5 disengage the first buffer-full state only in the event that the first buffer-full state exists, but an arrangement may be employed in which the first buffer-full state is disengaged unconditionally whenever an abnormal state occurs.

This embodiment describes a process to be executed when the buffer-full state occurs. However, this process is also executed in the state of printer cover open, paper-jam, or ink exhaust.

First Variation of First Embodiment

With the above first embodiment, the arrangement is such that data is received to the stand-by area of the reception buffer to empty the FIFO of the host device, following which the occurrence of an abnormal state is notified to the host device from the printer device. Correct operation of this method is based on the assumption that the once the host device detects that an nFault signal or nPeriphRequest signal has been asserted, the host device cuts off transmission at an appropriate point, and permits transmission of data from the printer device to the host device.

However, it has been found that, depending on some host devices, transmission of data from the printer device to the host device is only permitted around every four seconds, regardless of asserting/negating of nFault signals or nPeriphRequest signals. In the case of such host devices, the above embodiment has the stand-by area set at 12 kbytes, so $$12 \text{ k[bytes]}/4\text{[seconds]}=3\text{k[bytes/second]} \qquad (8)$$

is established, and in the event that the reception speed exceeds 3 kbytes/second, the above stand-by area is used up before the host device is notified of the abnormal state. The transfer speed of IEEE 1284 interfaces is at the slowest several tens of kbytes/second or faster, so he reception speed easily exceeds 3 kbytes/second.

Figure 8:
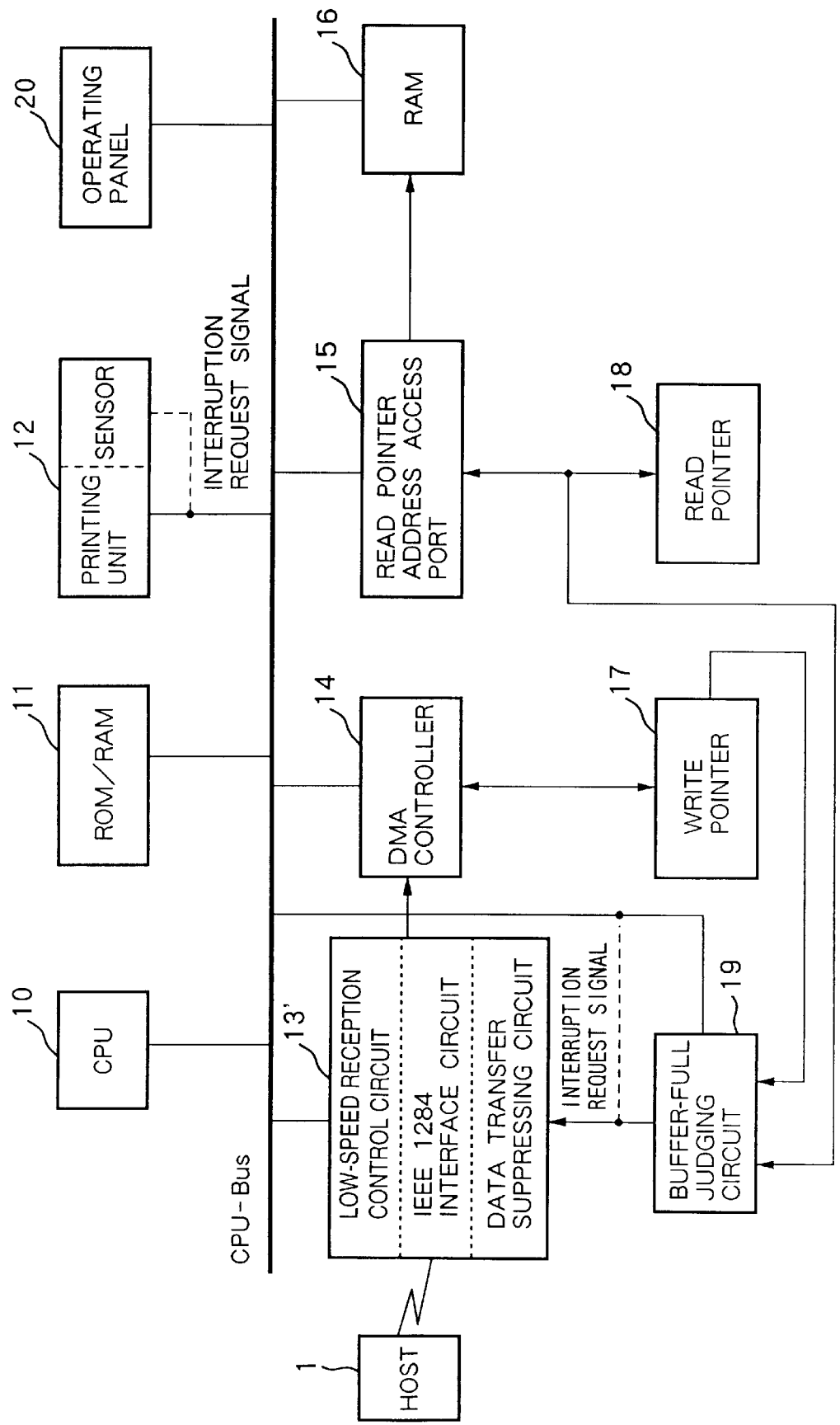
FIG. 8 is a configuration diagram of a printer device according to a second embodiment.

This variation has been devised to deal with this problem. FIG. 8 is a block diagram of the printer device according to the present embodiment. In the Figure, reference numerals 10 to 12, and 14 to 20 are exactly the same as described with reference to FIG. 1. The IEEE 1284 interface 13' is different to the IEEE 1284 interface 13 in that it is internally provided with a low-speed reception control circuit which lowers the reception speed based on commands from the CPU 10.

Figure 9:
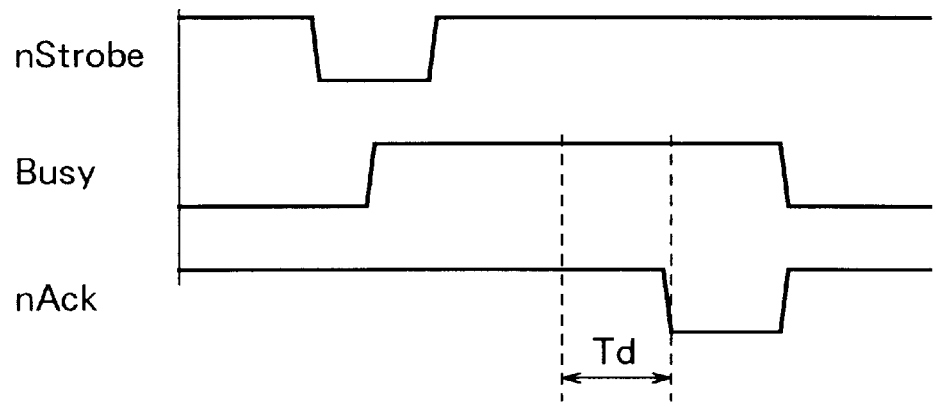
FIG. 9 is a timing chart for describing the lowering of reception speed.
Figure 10:
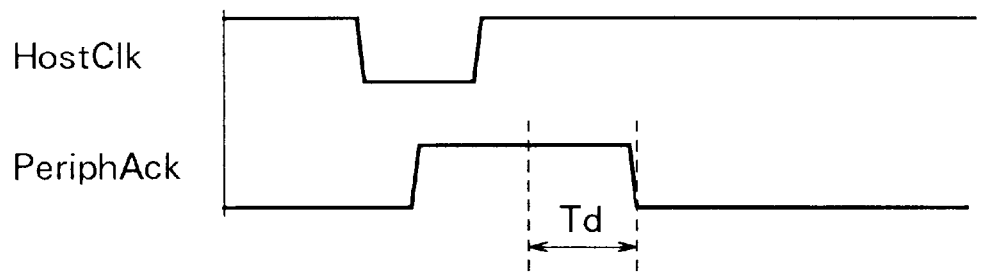
FIG. 10 is a timing chart for describing the lowering of reception speed.
Figure 11:
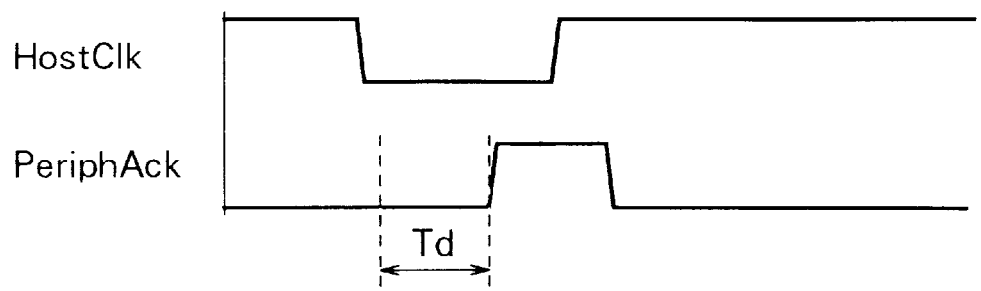
FIG. 11 is a timing chart for describing the lowering of reception speed.

In order to lower the reception speed in the compatible mode, all that is necessary is to insert additional time Td before asserting the nAck signal, as shown in FIG. 9. Also, in the ECV mode, all that is necessary is to insert additional time Td before the Event 32 stipulated by IEEE 1284 as shown in FIG. 10, or before the Event 36 as shown in FIG. 11. The length of the additional time Td can be determined from the size of the stand-by area and interval spacing. In the present embodiment, it is set at 2 msec. In this case, the reception speed is around $$1[byte]/2[msec]=500[bytes/second] \qquad (9)$$

and thus is slower than the above 3 kbytes/second.

Figure 12:
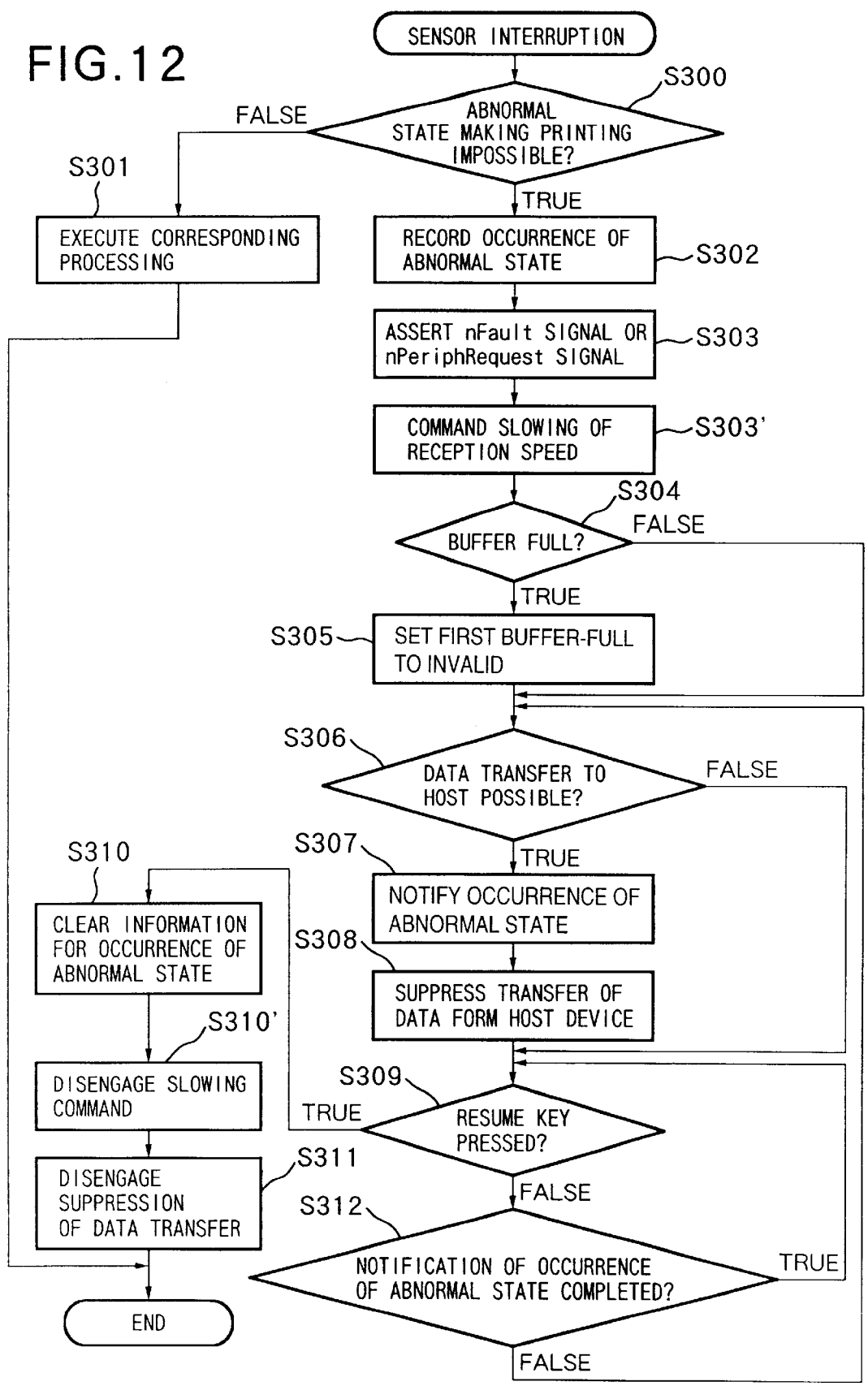
FIG. 12 is a flowchart for interruption processing for the second embodiment.

Next, description shall be made regarding when to lower the reception speed. FIG. 12 is a flowchart for interruption processing to be executed according to a second embodiment in the case that a interruption request signal from the printing unit 12 reaches the CPU 10. In the Figure, the processing in Steps 300 through 312 is the same as that in FIG. 5. What is different with the flowchart shown in FIG. 5 is that a Step 303' has been inserted between Step 303 and Step 304, and that a Step 310' has been inserted between Step 310 and Step 311. With the present embodiment, once an abnormal state occurs slowing of speed is instructed in Step 303', and after the resume key is pressed, disengaging the slowing of speed is instructed in Step 310'. When slowing of speed is instructed, as shown in FIGS. 9 through 11, a delay time td is inserted before a certain event by means of a slow speed reception controlling circuit, and reception of each byte is delayed by a certain time td so that the reception speed is slowed.

That is to say, with the present embodiment, the reception speed is slowed after occurrence of an abnormal state, so even if reception to the stand-by area has begun, the FIFO of the chip set of the host device is emptied before the stand-by area is all used up. Accordingly, data transfer from the printer device to the host device is permitted, and the host device can be notified of the occurrence of the abnormal state.

Second Variation of the First Embodiment

Figure 13:
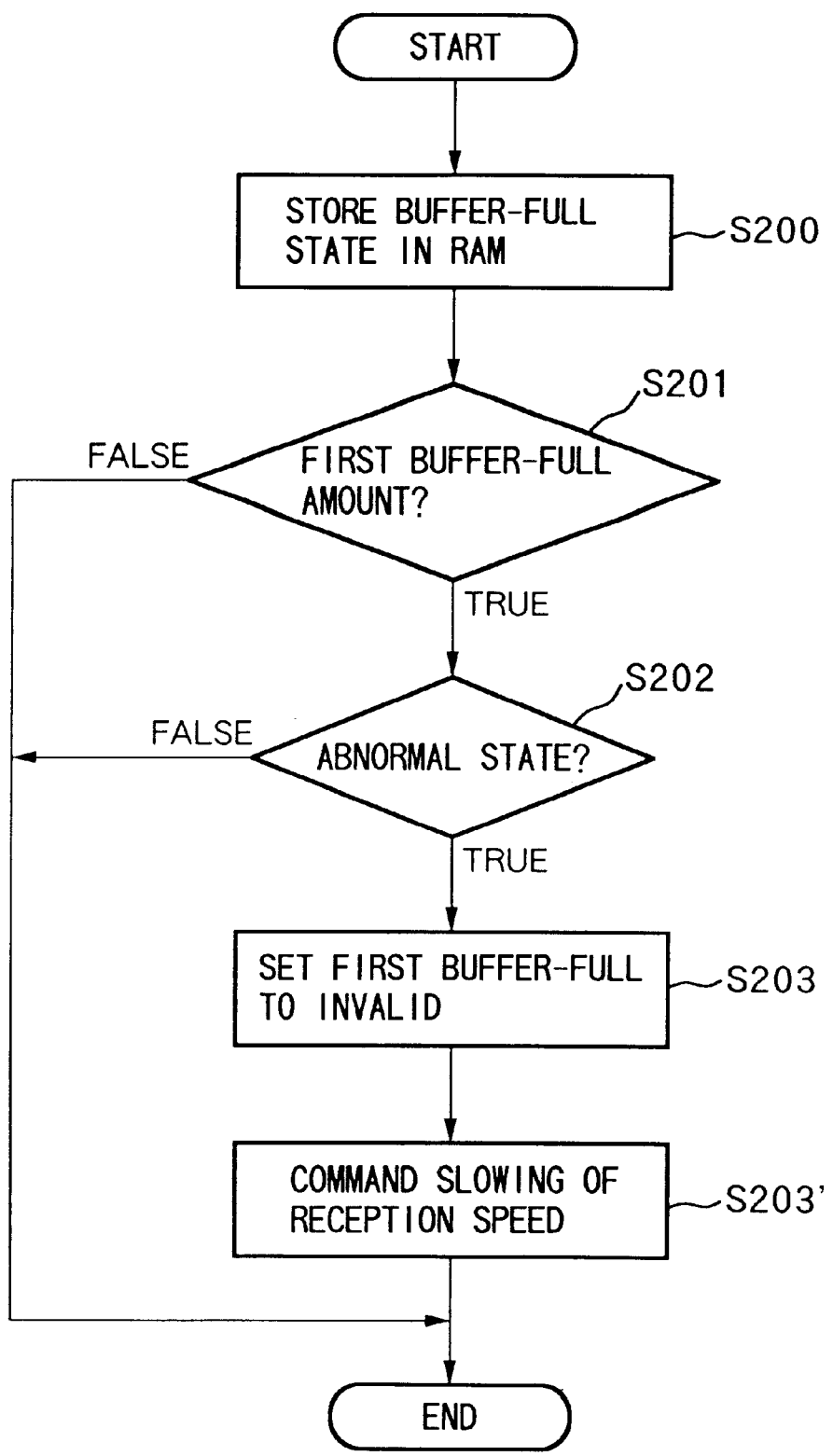
FIG. 13 is a flowchart for interruption processing for a third embodiment.

Slowing of the reception speed may be carried out as described below. FIG. 13 is a flowchart for interruption processing to be executed according to this variation in the case that a buffer-full interruption request signal reaches the CPU 10. In the Figure, the processing in Steps 200 through 203 is the same as that in FIG. 4. What is different with the flowchart shown in FIG. 4 is that a Step 203' has been added.

Figure 14:
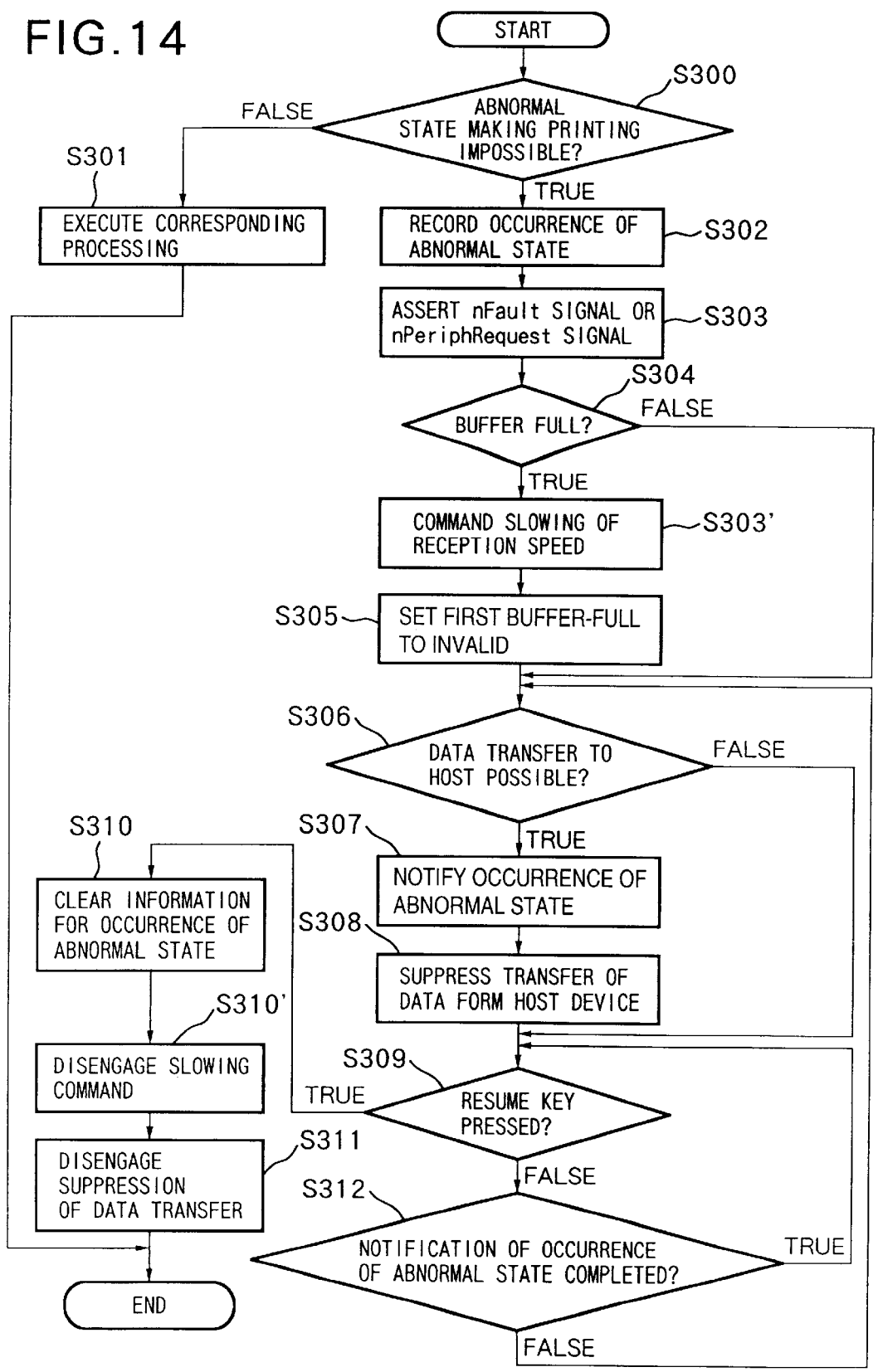
FIG. 14 is a flowchart for interruption processing for the third embodiment.

Also, FIG. 14 is a flowchart for interruption processing to be executed according to the third embodiment in the case that an interruption request signal from the printing unit 12 reaches the CPU 10. What is different with the flowchart shown in FIG. 12 is that a Step 303' has been inserted between Step 304 and Step 305.

With the present embodiment, once reception to the stand-by area starts, slowing of speed is instructed in Step 203' or Step 303', and after the resume key is pressed, disengaging the slowing of speed is instructed in Step 310'.

That is to say, with the present embodiment, the reception speed is slowed when reception to the stand-by area starts, and transfer of data from the printer device to the host device is permitted before all of the stand-by area is used up, thereby enabling notification of an abnormal state to the host device.

As described above, according to the first and second variations of the first embodiment, notification of an abnormal state which has occurred at the printer can be notified even to host devices which do not permit transfer of data from the printer device to the host device except at intervals of around four seconds.

Though description of the variations of the first embodiment has been made with reference to an example of a printer device having an IEEE 1284 interface, but the present invention of course can be applied to other interfaces, as well. Also, excellent effects can be obtained by applying the present invention to peripheral devices other than printers, as well.

According to the present device as described above, in cases where the host does not have a transmitting FIFO and receiving FIFO independently, but shares one FIFO for both transmission and reception, an abnormal state which has occurred at the printing device can be notified to the host by stopping transmission of data from the host without loosing any data in the FIFO.

Also, control at the host is unchanged as compared to the known system, and the above advantages are obtained by control at the printing device, so a printer device can be provided which sufficiently makes use of the bi-directional functionality, even when combined with computers which are already on the market.

Also, since this technique does not violate already-existing protocols such as IEEE 1284, the same compatibility is maintained with the operations of the personal computers. That is, there is no need to change the operations of the personal computer to differentiate between connecting to a printer device which employs the present invention and connecting to a printer device which does not.

Second Embodiment

Figure 15:
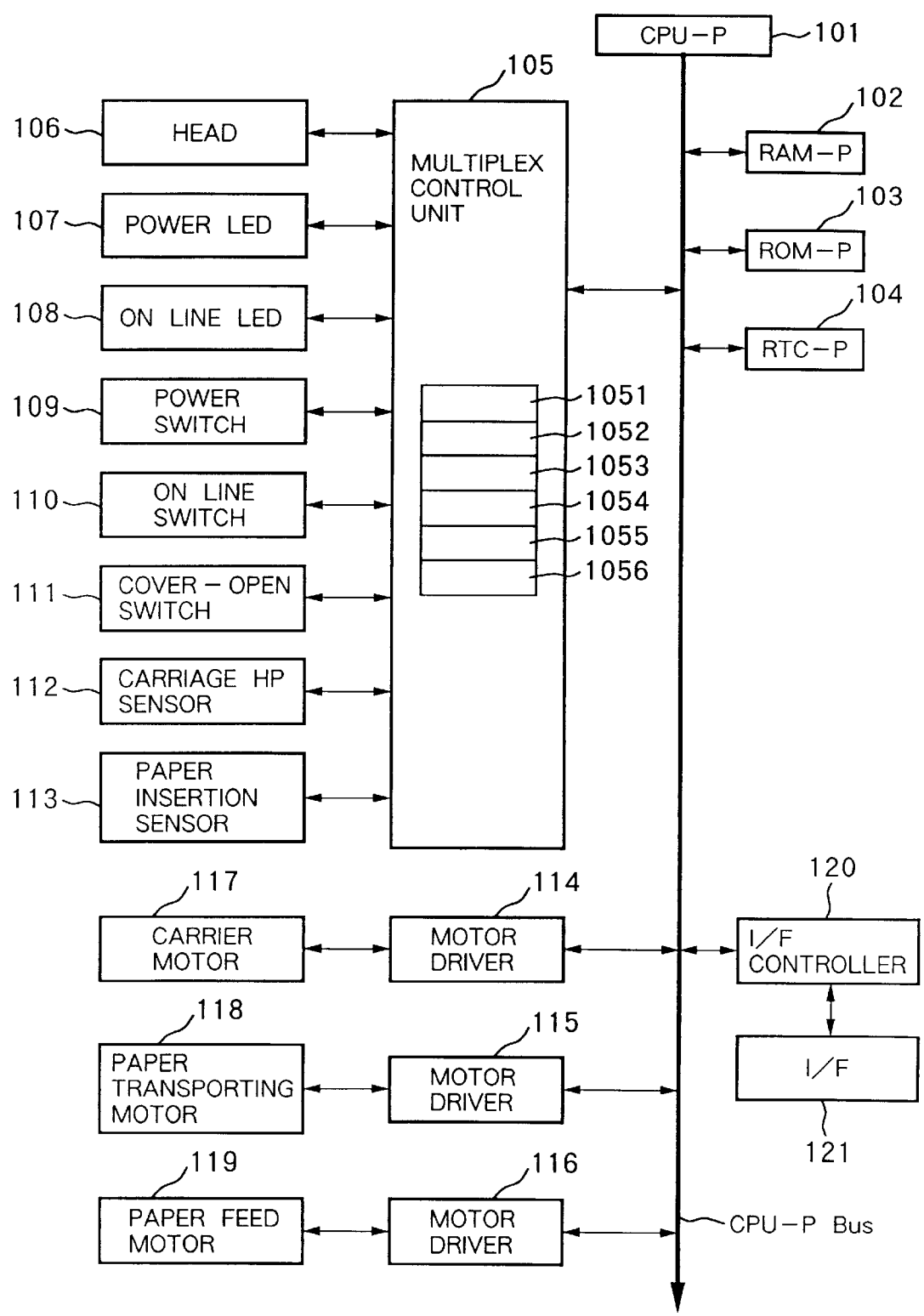
FIG. 15 is a block diagram of the recording device.

FIG. 15 is a block diagram showing the configuration of an ink-jet recording device which is an embodiment of the present invention.

In the Figure, CPU-P101 is a CPU (Central Processing Unit) which controls the entire printer device, and, by means of a control program in the ROM-P103, and based on instruction signals input via a multiplex control unit 105 from various means such as two sensors (the carriage home position sensor 112 and paper insertion sensor 113) and the switches 109 through 111 provided on the operating panel, and on printing commands sent to the interface 121 from the host which has read from the I/F controller 120, the CPU-P101 controls rotation of three motors (the carriage motor 117, paper transporting motor 118, and paper feed motor 119) via the motor drivers 114 through 116, outputs recording data to the recording head (ink-jet head) 106 via the multiplex control unit 105, transfers the printing data to the recording head, and performs printing control according to commands.

RAM-P (RAM at the recording device; temporary memory) 102 serves as a reception buffer for temporarily storing data received from the host (printing commands and printing data), work area for storing necessary information such as the printing speed, work area for the CPU-P101, and so forth.

The ROM-P (ROK read-only memory at the recording device) 103 stores printing control programs to transfer printing data to the printing head to be executed by the CPU-P101, programs for controlling the carrier or paper feeding, printer emulation, printing fonts, etc.

RTC-P104 is an RTC (Real-Time Clock) for knowing the time necessary for control.

The multiplex control unit 105 has functions such as controlling the head 106, the power LED 107 and On-Line LED 107 so as to be turned on, off, or blink, detecting the On-Line switch 110, cover-open switch 111, detecting the carriage home position sensor 112, paper insertion sensor 113, and so forth.

The motor drivers 114 through 116 drive the motors. Also, in order to control the later-described reception buffer, provided are: a lead address register 1051 for setting the lead address of the reception buffer, a buffer size register 1052 for setting the size of the reception buffer, a delay area size register 1053 for setting the size of the delay area in which the processing speed of the data stored therein is slowed, a stand-by area size register 1054 for setting the size of the stand-by reception area, a delay time register 1055 for setting the delay of the processing in the delay area, and a stop/continue register 1056 for specifying whether to stop reception or to proceed therewith in the event that data has been received to the lower end of the delay reception area.

The motors 117 through 119 are connected to the above motor drivers, and are driven and controlled by the motor drivers under commands from the CPU-P101.

The carriage motor 117, paper transporting motor 118, and paper feed motor 119 each use a stepping motor which is easily controlled by the CPU-P101.

The I/F controller 120 is connected to the computer at the host side via the I/F 121, and controls the bi-directional Centronics Interface which receives command data and printing data from the host computer.

Figure 16:
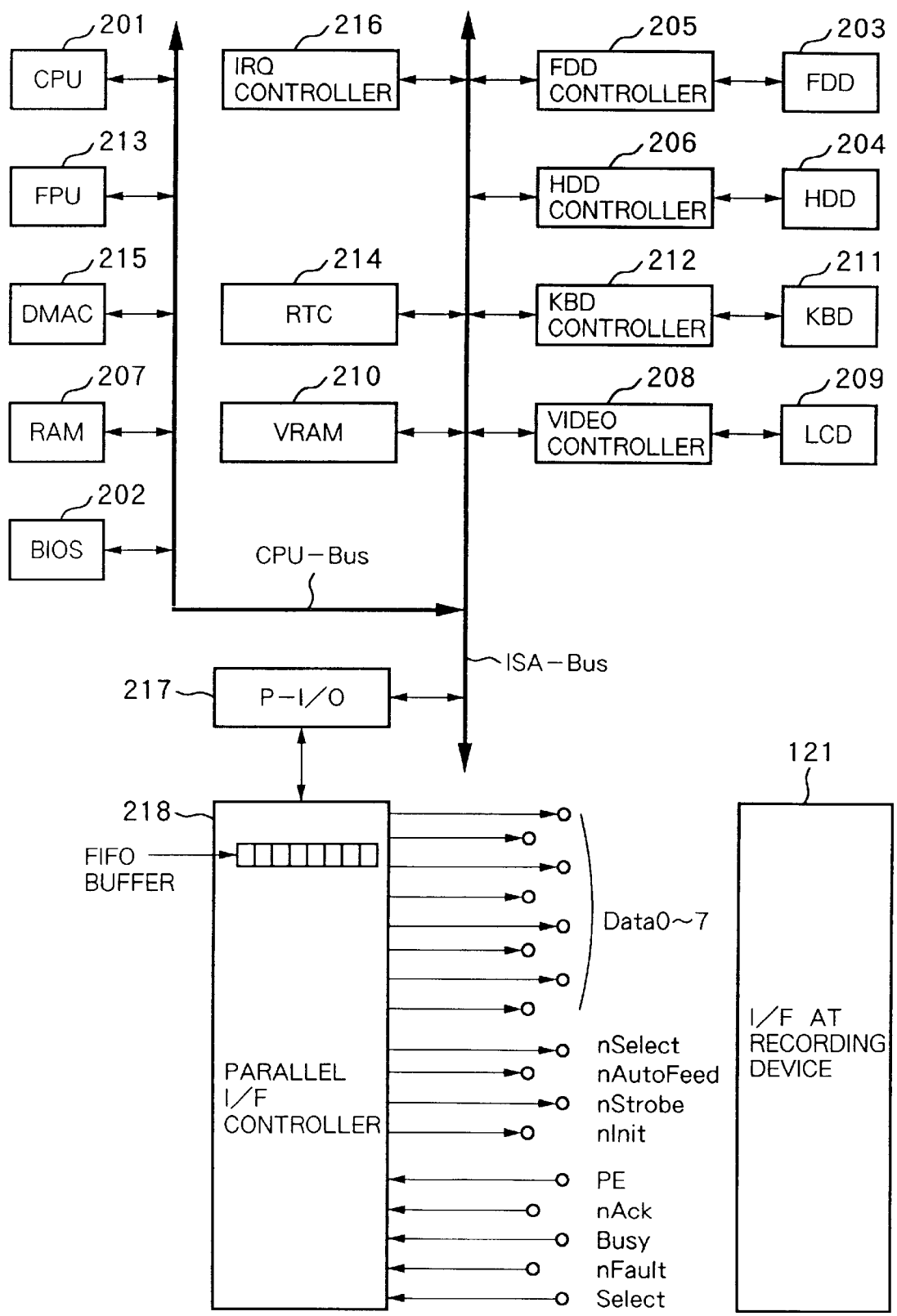
FIG. 16 is a block diagram of a typical host-side computer.

FIG. 16 is a block diagram illustrating the configuration of the host computer.

At the host computer, the central processing unit 201 (CPU) handles main control, and the BIOS ROM 202 commands the basic control thereof. Application programs are read from the floppy disk (FDD) 203 or the hard disk (HDD) 204 which are memory devices which can be written to and read from, via the floppy disk controller 205 (FDC) or hard disk controller 206 (HDC), the application programs are rendered in the system main memory (MAIN DRAM) 207, and executed using the main memory 207.

At this time, display is made by displaying characters and the like written to the video memory (VRAM) 210 on the liquid crystal display (LCD) 209 using the video graphic array controller (VGAC) 208, and key input from the keyboard 211 passes through the keyboard controller (KBC) 212. Here, the numerical data processor (FLU) 213 supports the CPU 201 in numerical data processing. Also, the real-time clock (RTC) 214 shows the elapsed time at the current time, and continues to operate by dedicated battery even when the power to the entire system is turned off. The SRAM 219 within the RTC stores system information such as the operation state of the system. The contents of this are also maintained by dedicated battery even when the power to the entire system is off.

The DMA controller 215 (DMAC) performs direct and high-speed data transfer between memory and memory, memory and I/O, and I/O and I/O, without involvement of the CPU 201. The interruption controller 216 (IRQC) accepts interruption signals from each of the I/Os, and carries out processing according to the priority thereof. The tinier has several channels of free-running timers, and handles various types of time management.

The host computer sends and receives data to and from the recording device via the P-I/O register 217, while controlling the parallel I/O controller 218.

Figure 17:
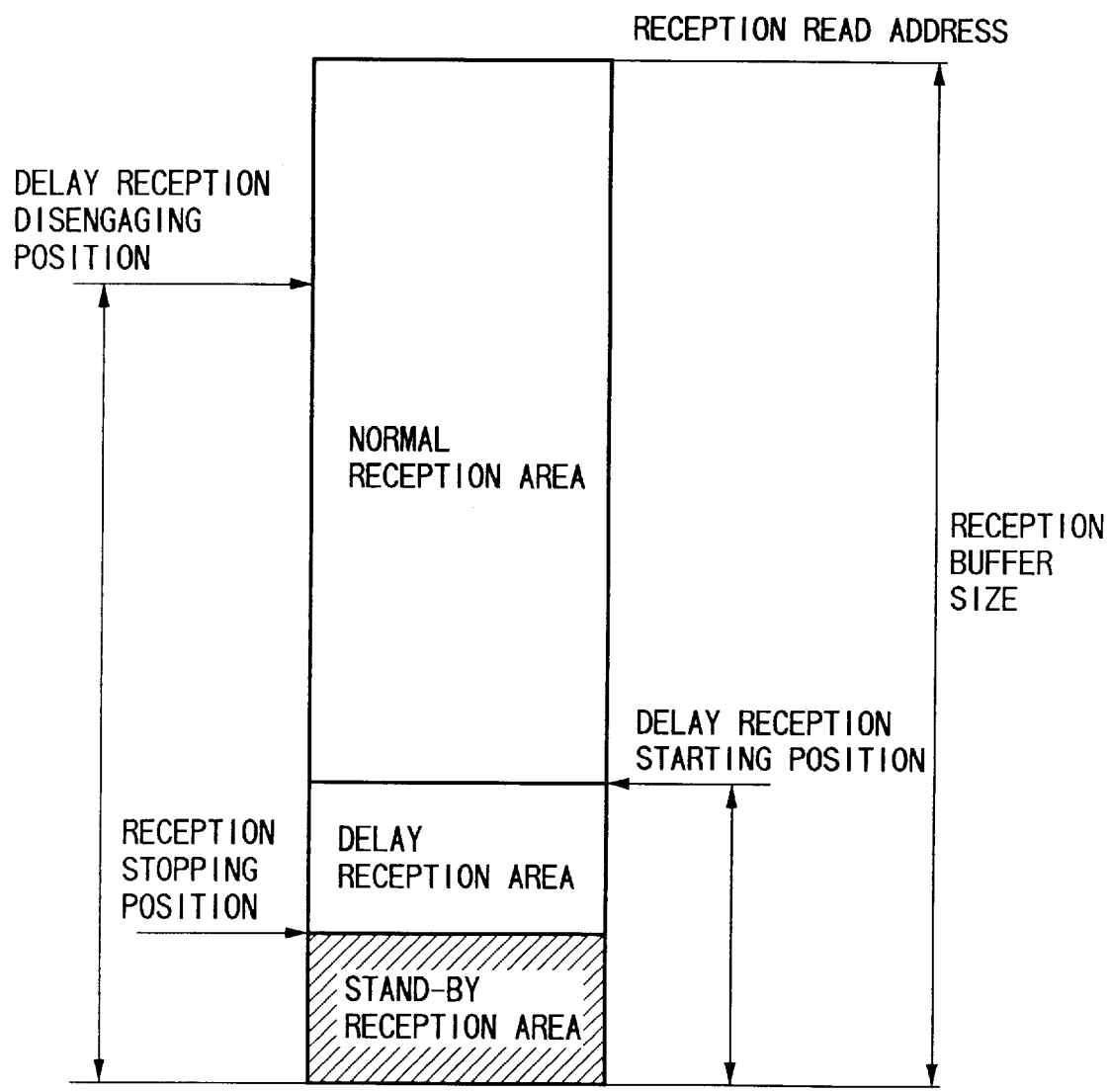
FIG. 17 is a schematic diagram illustrating the construction of a receiving buffer at the recording device according to the present invention.

FIG. 17 is a schematic diagram illustrating the configuration of the reception buffer of the recording to device according to the present embodiment. The reception buffer itself is a part of the area within the RAM-P102 at the recording device and is of a ring-like configuration. It receives from the leading address, and when reception is made to the end of the buffer, tries to write data to the leading address once more. The CPU-P101 reads data in a manner parallel with the reception, so by the time that data is being written to the end area of the reception buffer, normally the data at the lead area has already been processed, so the lead area is ready for writing. In reality, these processes are controlled from the aforementioned multiplex control unit 105 according to the settings of the buffer address register 1051, buffer size register 1052, delay area size register 1053, stand-by area size register 1054, delay time register 1055, and stop/continue register 1056, which are on the multiplex control unit 105.

Also, since the reception buffer is a ring buffer, the write addresses and read addresses in the buffer are pointed to and managed by respective write and read pointers. Accordingly, the lead address does not refer to a physical address on the reception buffer, but to an address pointed to by the write buffer in the initial state. Also, the empty area in the buffer consists of the area from the address to which the write pointer is pointing at to the address to which the read pointer is pointing to. Accordingly, the delay reception area or stand-by reception area shown in FIG. 17 do not have absolute addresses. The delay reception area is an area of a certain size behind the stand-by reception area. Accordingly, these areas are both moving along with the read pointer. Thus, whether the write pointer has entered the delay reception area or stand-by reception area is judged by the relative positional relation with the read pointer. When the difference between the write pointer and the read pointer falls below the sum of the size of the delay reception area and stand-by reception area, reception data is subsequently written into the delay reception area, unless the read pointer moves. In the event that the write pointer further moves, and the difference between the write pointer and the read pointer falls below the size of the stand-by reception area, reception data is subsequently written into the stand-by reception area, unless the read pointer moves. Accordingly, the later-described reception stop position and delayed reception disengaging position are determined based on the positional relation between the read pointer and write pointer (i.e., size of available area). In FIG. 17, the lead address, delay reception area, and stand-by reception area of the reception buffer are indicated fixedly, but by viewing the reception lead address as the value of the read pointer, control the same as that in a ring-shaped reception buffer is being carried out.

Now, the reception buffer controller within the multiplex control unit 105 writes data received from the I/F onto the RAM-P102 from the lead address until the delay area is filled. At this time, unless the received data is read by the CPU 101 and continues to be received, delay of reception is started by the multiplex control unit. In the event that data further continues to be received, and the stop/continue switching register setting is set to stop, reception is stopped at that point. There are cases in which received data cannot be processed even by a recording device which is operating normally. For example, the time during which the recording head is being cleaned is such. Accordingly, in order to prevent a time-out during this time, data reception is delayed so that 16 msec are required from receiving each byte. Also, in the event that the cleaning operation for the recording device requires 60 seconds, a delay reception area is set of a size of 60/0.016=3750 bytes, i.e., around 4 Kbytes. This is enough capacity to store received data within the delay reception area till the cleaning operation is completed, even in the event that the cleaning operation started with the normal reception area full.

In the event that there is trouble at the recording device, and reception data is not processed so the delay reception area becomes full, reception is not stopped but rather the received data is written to the stand-by reception area. In the event that reception further continues and the stand-by reception area becomes full, reception stops at that point. The host printer driver sends data in units of 4 kbytes. Accordingly, taking into consideration cases in which an error occurs while writing received data to the end of the delay reception area, at least 4 Kbytes are necessary for the stand-by reception area. In the present embodiment, the stand-by reception area is set at around 10 Kbytes.

Also, the delay time for using the delay reception area is normally set at 16 msec which is within the stipulated time (35 msec) between ECP events 37–32 in IEEE 1284.

Figure 18:
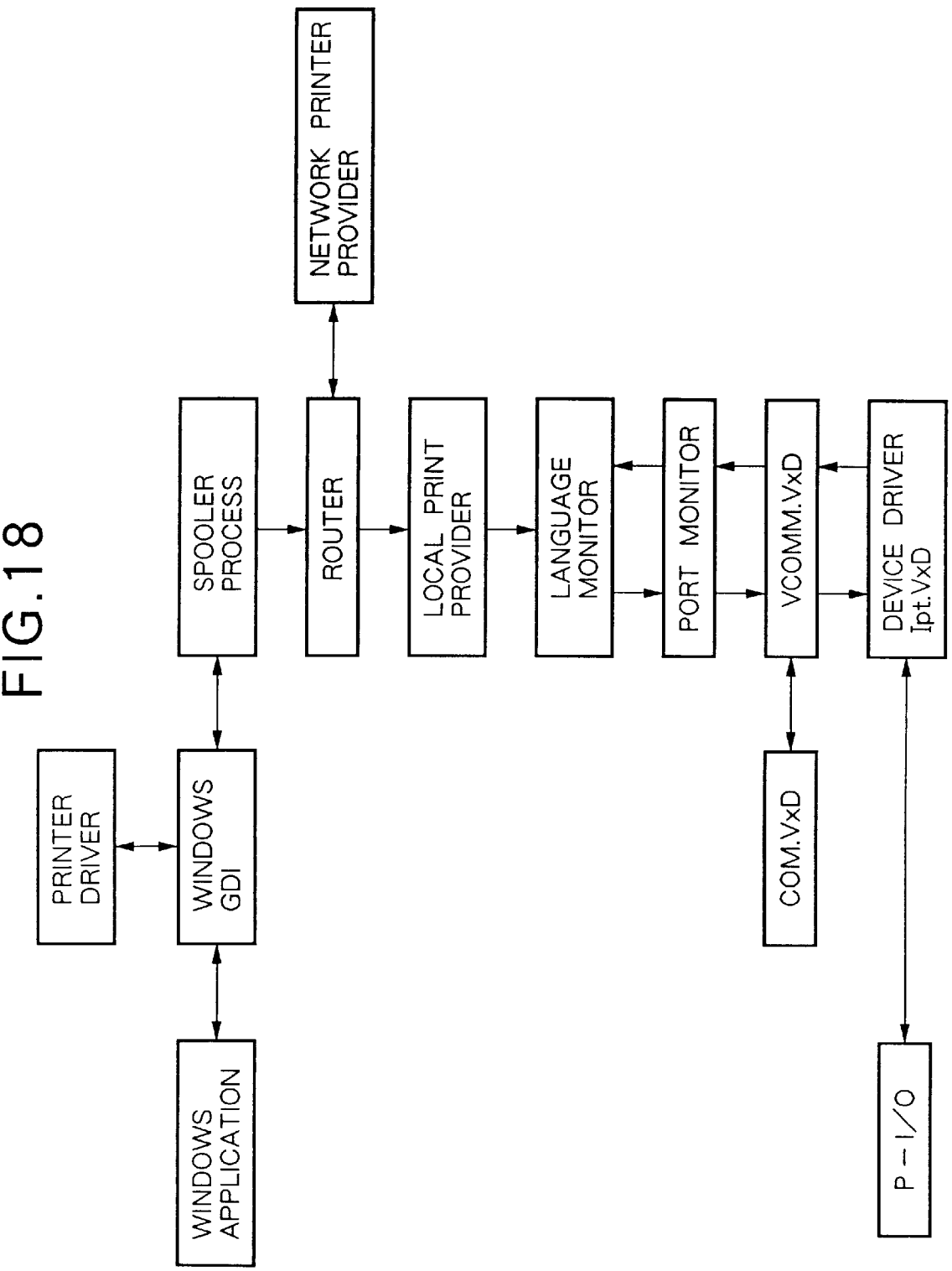
FIG. 18 is a block diagram illustrating the flow of printing data processing in a typical host-side computer.

FIG. 18 is a block diagram illustrating the flow of data at the host computer when transferring printing data to the recording device from a normal host computer using a parallel interface (Centronics Interface) or IEEE 1284 compatible mode.

The data output from the application program is sent to the printer driver. The printer driver converts output data into printing data. At this time, by using, e.g., Microsoft Corporation's Windows as the operating system, output data is converted into printing data by calling GDI (graphic device interface) functions from the printer driver. The converted printing data is stored in a spool file, and is handed to a language monitor (LM) via a router, local print provider, etc. With the present embodiment, the data is transferred to a recording device connected as a local printer. The LM writes the data handed to it to the port monitor with no change. The port monitor writes the data to a physical port by a LPT port device driver (Ipt. VxD), via a VCOMM. VxD. The maximum size of data handed from the spooler at one time is 4 Kbytes. The language monitor (LM) executes polling every four seconds to see whether there is any reverse information from the recording device, while waiting the results of the written data. In the event that an error occurs at the recording device and there is information to return to the host side, the results of polling will be "return data exists", so based on this information the state is displayed on the monitor of the host as a message or graphical representation. In the event that transmission of the written data is completed with no reverse information, data is written to the port monitor again. Repeating the above process carries out transfer of printing data to the recording device.

Figure 19:
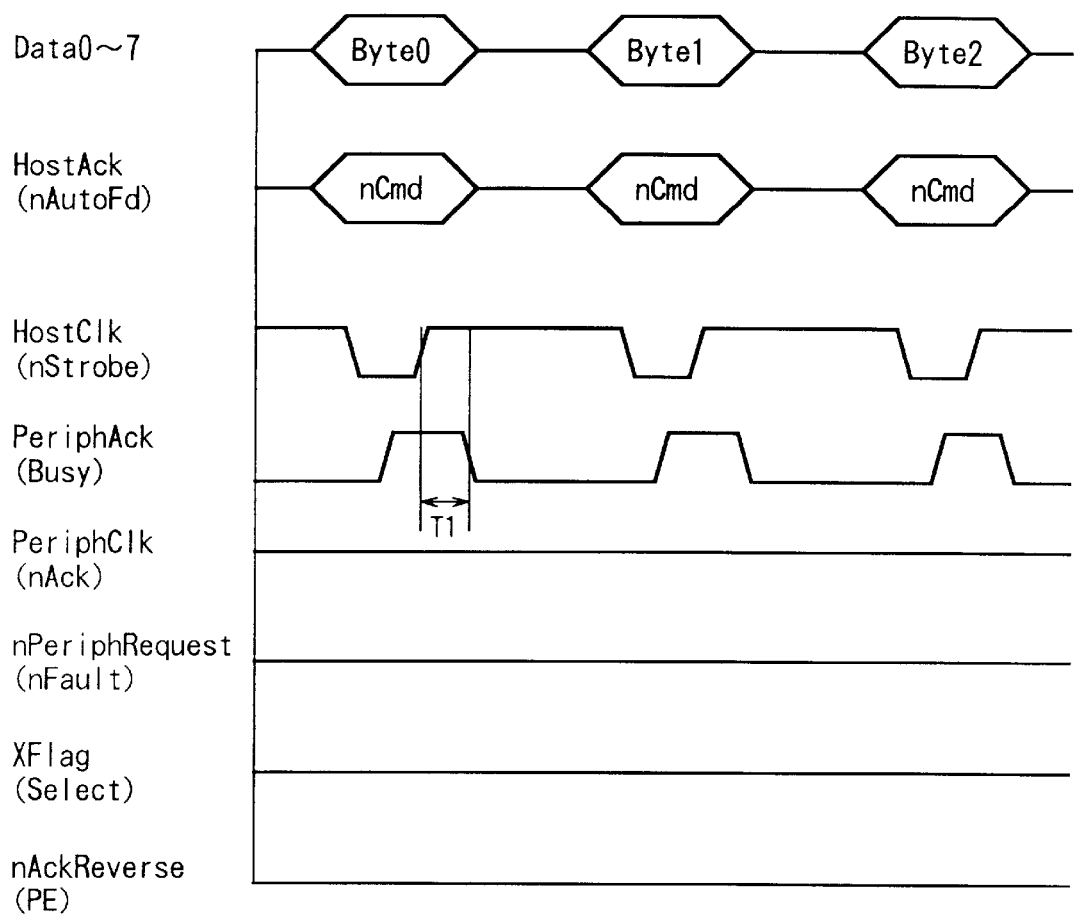
FIG. 19 is a timing chart illustrating the changing process for delaying speed in the event of data reception with the present embodiment.

FIG. 19 is a timing chart showing the process of transferring data from the host to the recording device in the ECP forward mode by IEEE 1284. In the event of delaying the data transfer process from the host, the recording device delays so that the time T1 from negating of the HostClk to asserting of the PeriphAck is asserted is 16 msec.

Figure 20:
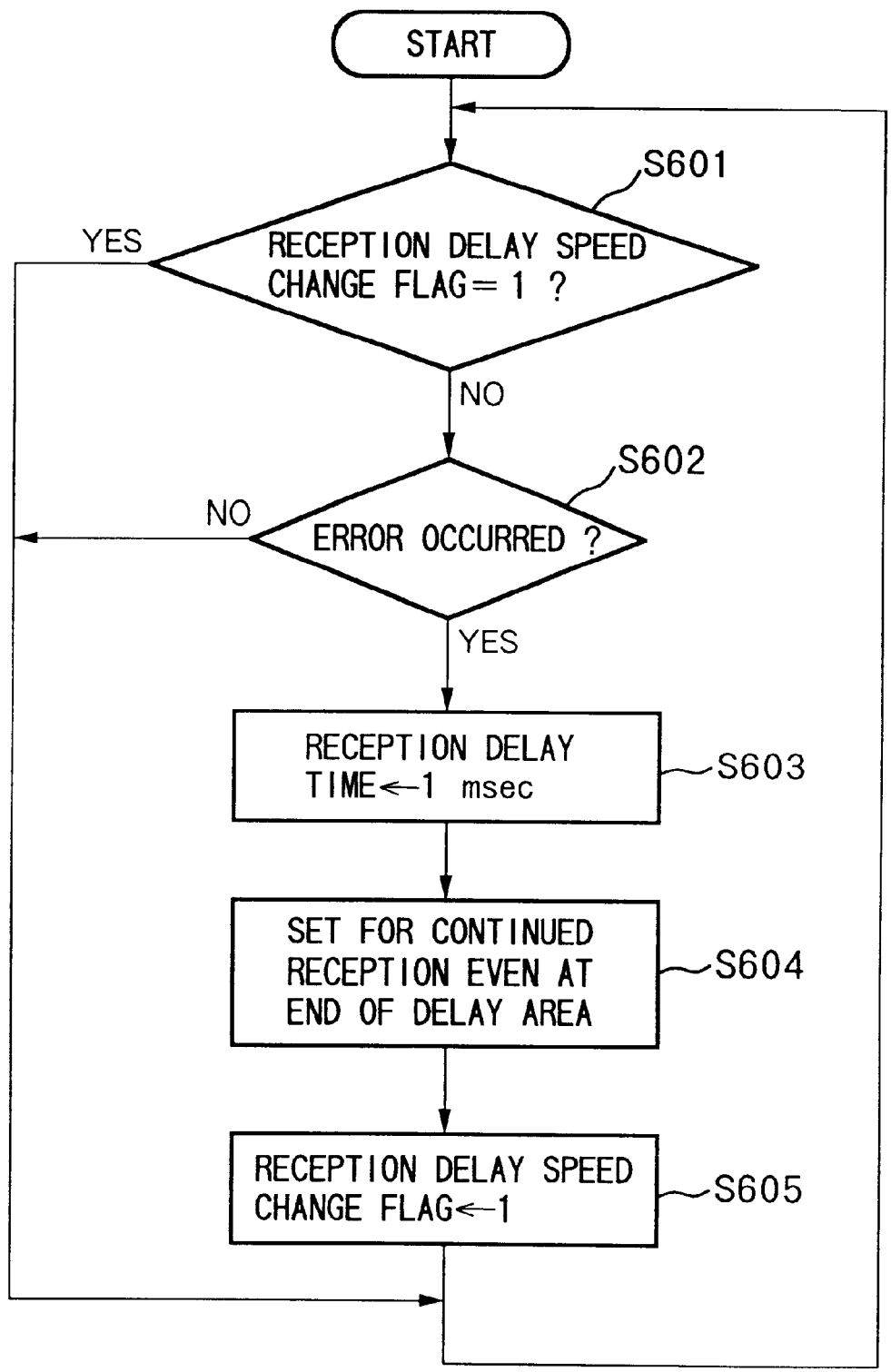
FIG. 20 is a timing chart illustrating the changing process for delaying speed in the event of an error with the first embodiment of the present invention.

FIG. 20 is a flowchart showing the process of monitoring errors during reception by the recording device. In the present embodiment, a real-time operating system is operating on the CPU-P, and detection of errors during reception and processing of changing the delay speed are performed within task processing of the real-time operating system. In Step 601, whether or not reception delay speed has already been changed is checked, and in the event that this has been executed, nothing is done. In the event that it has not been executed, whether or not an error has occurred is checked in Step 602, and in the event that an error has occurred the flow proceeds to Step 603, and changes the reception delay time T1 to 1 msec (normally 16 msec).

Next, in Step 604, with the setting such that reception is continued even at the end of the delay reception area (i.e., the stand-by reception area is released), in Step 605 a delay speed changing flag is set to indicate that the reception delay speed has been changed.

Owing to such control, the delay time for receiving data is reset to 1 msec once an error occurs, so 4 Kbytes of data are received over a period or around 4 seconds following occurrence of the error. That is to say, reception of the 4 Kbytes of data written to the aforementioned LM is completed. As described above, the host computer executes polling at four-second interface regarding whether or not there is any reverse data, so the occurrence of the error can be notified to the host computer by the recording device responding to the polling when an error has occurred, to that effect.

Once the host knows that there is error information from the recording device by means of the polling, the host stops transmitting of any new printing data. Thus, the printing data sent from the host computer to the recording device following the occurrence of the error is around 4 Kbytes at the most, and this can be stored in the stand-by reception area of the reception buffer. In this way, the host computer detects asserting of nPeriphRequest according to the IEEE 1284 ECP mode stipulations due to an error state in the recording device, and receives the error information from the recording device by the IEEE 1284 ECP reverse mode in a state wherein there is no data written to the LPT port (i.e., in the state wherein the FIFO is not packed with data), thereby enabling displaying of the error information on the LCD 209 or the like.

Figure 21:
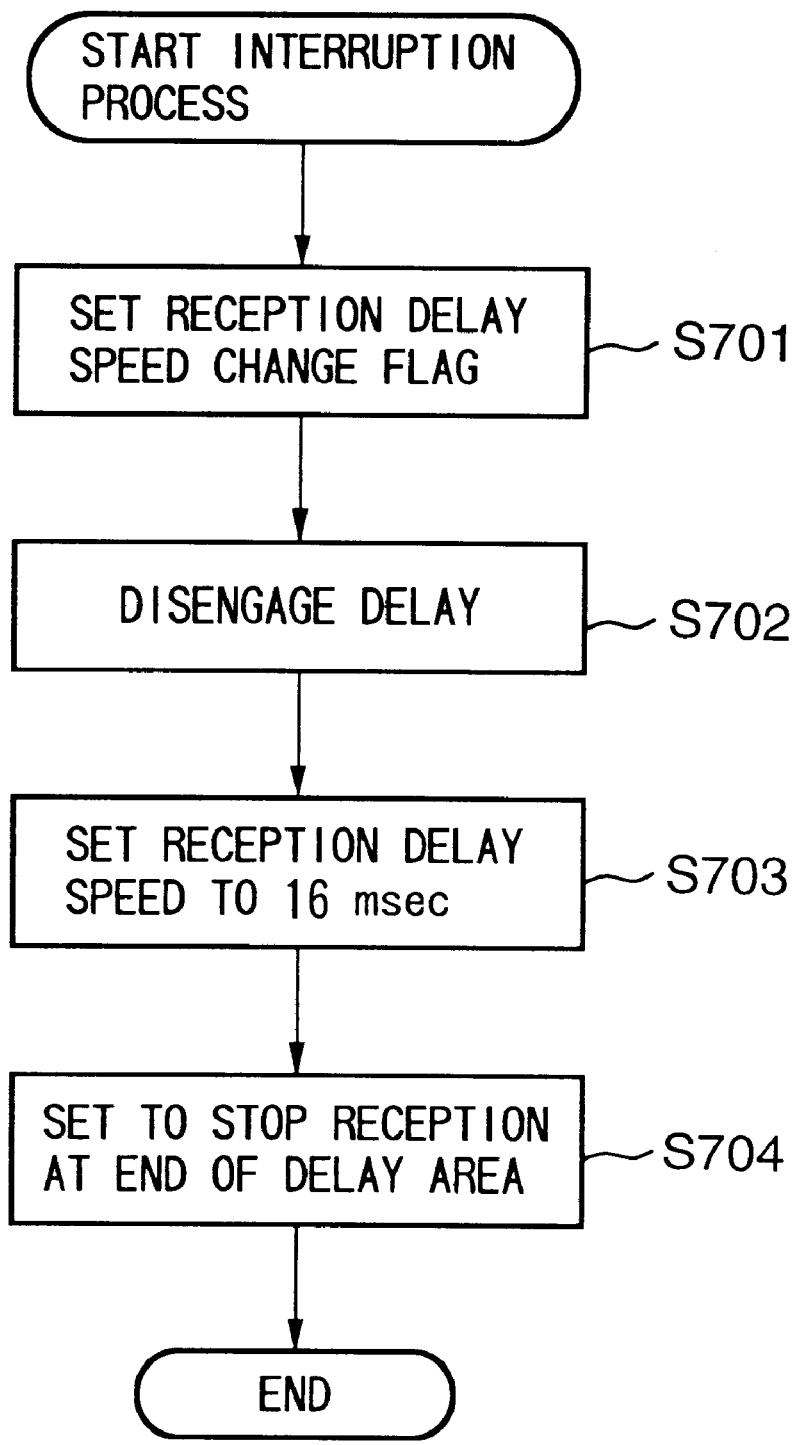
FIG. 21 is a timing chart illustrating the process for recovering from the delayed speed setting after the error with the first embodiment of the present invention.

FIG. 21 is a flowchart illustrating the processing procedures in the event that an empty area exceeding the certain size has occurred owing to cyclic monitoring of the recording device according to the present embodiment. Data processing has advanced and there is sufficiently little data within the reception buffer, so the delay speed changing flag which has been set to indicate that the reception delay speed has been changed, is cleared in Step 701. In Step 702, the delay is disengaged, in Step 703 the reception delay time is restored to 16 msec which is the normal state, and in Step 704 the flow executes setting for stopping reception at the end of the delay reception area (i.e., secures stand-by area).

Unless data processing is stopped for long periods of time due to errors or the like, data reception is performed at normal speed, and even in the event that the delay operation is initiated, data processing proceeds and the above disengaging is conducted.

Also, in the event that reception data processing has stopped due to an error or the like, information can be returned to the host after receiving a certain amount of data by means of the processing described with reference to FIG. 20 above, so once the cause of the error is removed and data processing is restarted, an interruption occurs at the point that the data within the buffer is sufficiently low, as with the case above, so the delay is disengaged, and setting is made so that reception of data to the stand-by area is stopped.

Figure 22:
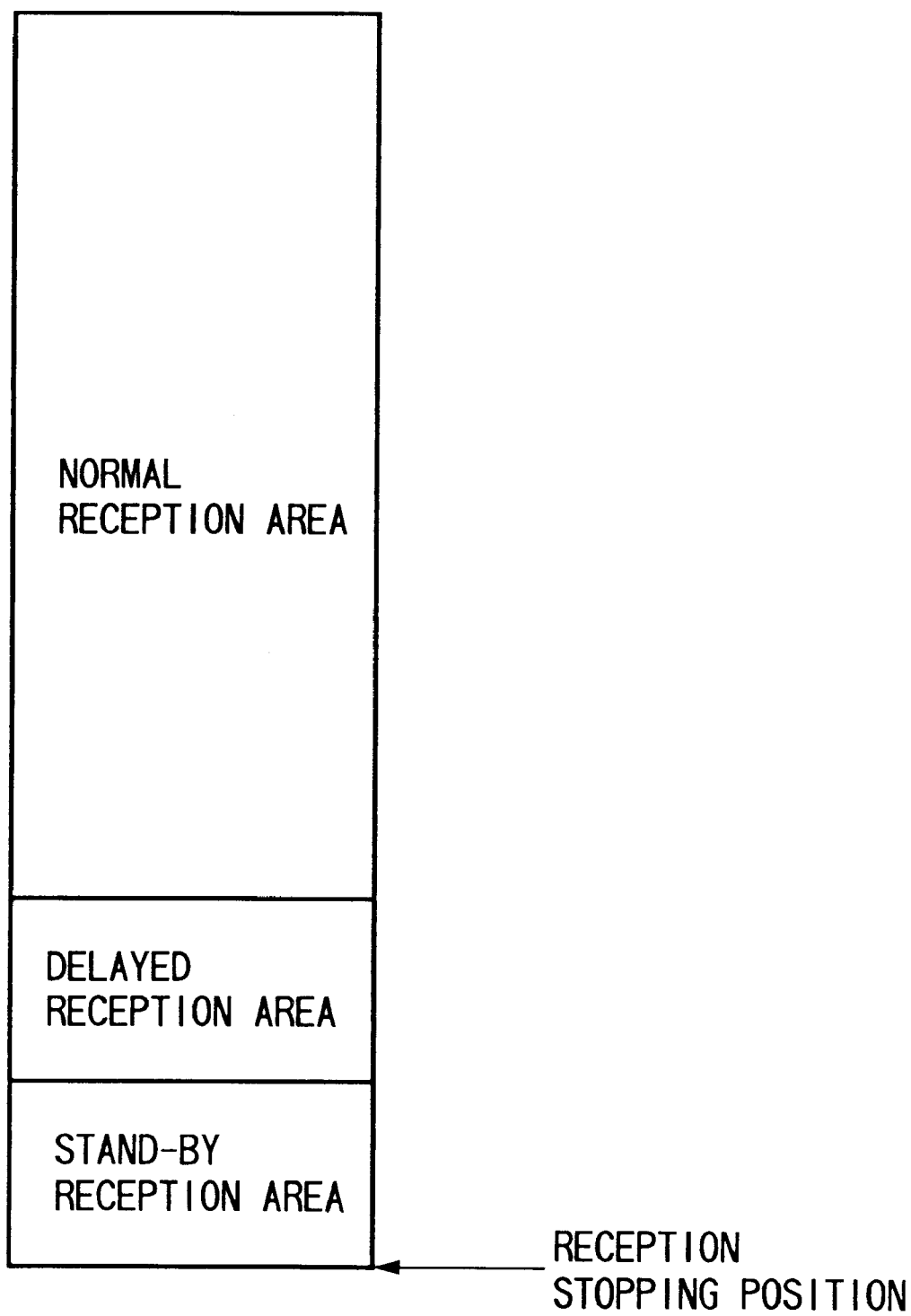
FIG. 22 is a schematic diagram illustrating the construction of the reception buffer at the recording device in the state that the stand-by area has been released according to the present embodiment.

FIG. 22 is a schematic diagram showing the structure and address area of the reception buffer at the time that an error has occurred at the recording device in the present embodiment. The setting is such that reception of data to the stand-by area is continued, so reception of data continues even if the delay area is full, and is continued until the stand-by reception area is full. At this time, the error has already been captured by the recording device, so the error state can be sent to the host computer by the time that the stand-by reception area becomes full.

As described above, a delay reception area is provided in the recording device according to the present embodiment. The delay reception area can store the maximum amount of data which can be received in the longest period of time during which the recording device itself may not be able to process received data. In the event that data is received to the delay reception area, the reception speed is slowed, so the delay reception area to be prepared can be small.

Also, in the event that an error occurs at the recording device, a stand-by reception area capable of storing at least an amount of data which is one unit (transmitting unit) of data transmitted from the transmitting side. Even if data is being received to the delay area, once occurrence of an error is detected, data transmission from the host is suppressed, and the delay speed is immediately changed to the normal speed. Accordingly, the data which the host is attempting to send is sent from the host computer at the normal speed. This data is stored in the buffer which contains the stand-by reception area. According, even in the event that an error occurs at the recording device, the host computer can complete sending the data being transmitted to the end of the transmission unit presently being transmitted. The host computer conducts polling to see whether there is any transmission data from the recording device at this time, so a situation in which the FIFO of the host computer is full and cannot receive data from the recording device does not occur. The recording device can send the error state to the host computer.

Further, since the data sent from the host when emptying the FIFO comes at a normal speed, the host can be speedily notified of the error.

First Variation of Second Embodiment

The second embodiment involves releasing the standby area when an error occurs and changing the delay reception speed. Conversely, and arrangement may be employed wherein reception to the standby reception area is enabled in the event that the recording device stops processing recording data due to occurrence of an error or the like, the time from the occurrence of the error is measured, and the delay is disengaged after a certain amount of time elapses, so that all data from the host to the port can be written. Thus, the FIFO at the host is emptied, and reverse transmission to the host can be carried out. The following is a detailed description of thereof. Incidentally, the system configuration, and the aspect in that reception is delayed as compared to normal reception as shown in FIG. 19 in the event that reception is temporarily stopped as shown in FIG. 19, are the same as the first embodiment.

Figure 23:
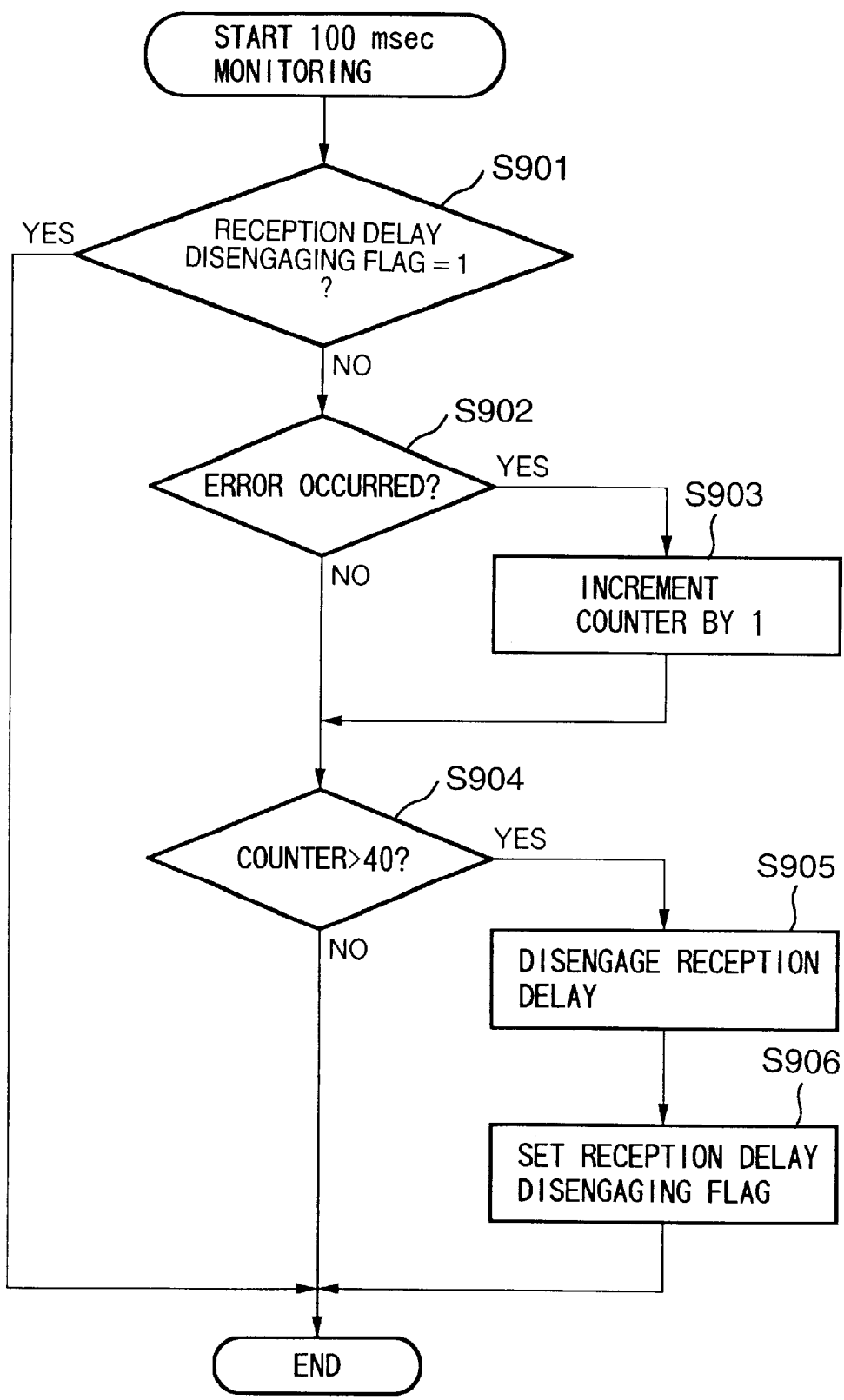
FIG. 23 is a flowchart illustrating the process of disengaging the delay in the event of an error occurring in the second embodiment of the present invention.

FIG. 23 is a flowchart illustrating cyclic monitoring according to the second embodiment.

In the present embodiment, a real-time operating system is operating on the CPU-P, and processing of changing the reception delay speed is performed within processing of the cyclic start-up handler on the real-time operating system. In Step 901, whether or not the reception delay has already been disengaged is checked, and in the event that it has been disengaged, nothing is done. In the event that it has not been disengaged, whether or not an error has occurred is checked in Step 902, and in the event that an error has occurred the flow proceeds to Step 903, and the counter is incremented by 1.

Next, the counter is checked in Step 904, and if 40 or less, no action is taken. In the event that the counter shows a value greater than 40, 4 seconds or more have elapsed from the occurrence of the error, so reception of the 4 Kbytes of data which the aforementioned LM has written is completed, and the data reception delay is disengaged for so that the host will take the information from the recording device at the reverse data polling conducted every four seconds. Thus, the remaining data is received at the normal speed.

Accordingly, the host detects asserting of an nPeriphRequest according to IEEE 1284 ECP mode stipulations owing to a state in which an error has occurred at the recording device, and receives the error information from the recording device by the IEEE 1284 ECP reverse mode in a state wherein there is no data being written to the port (i.e., data is not packed in the FIFO), thereby enabling displaying of the error information on a display device at the host.

Figure 24:
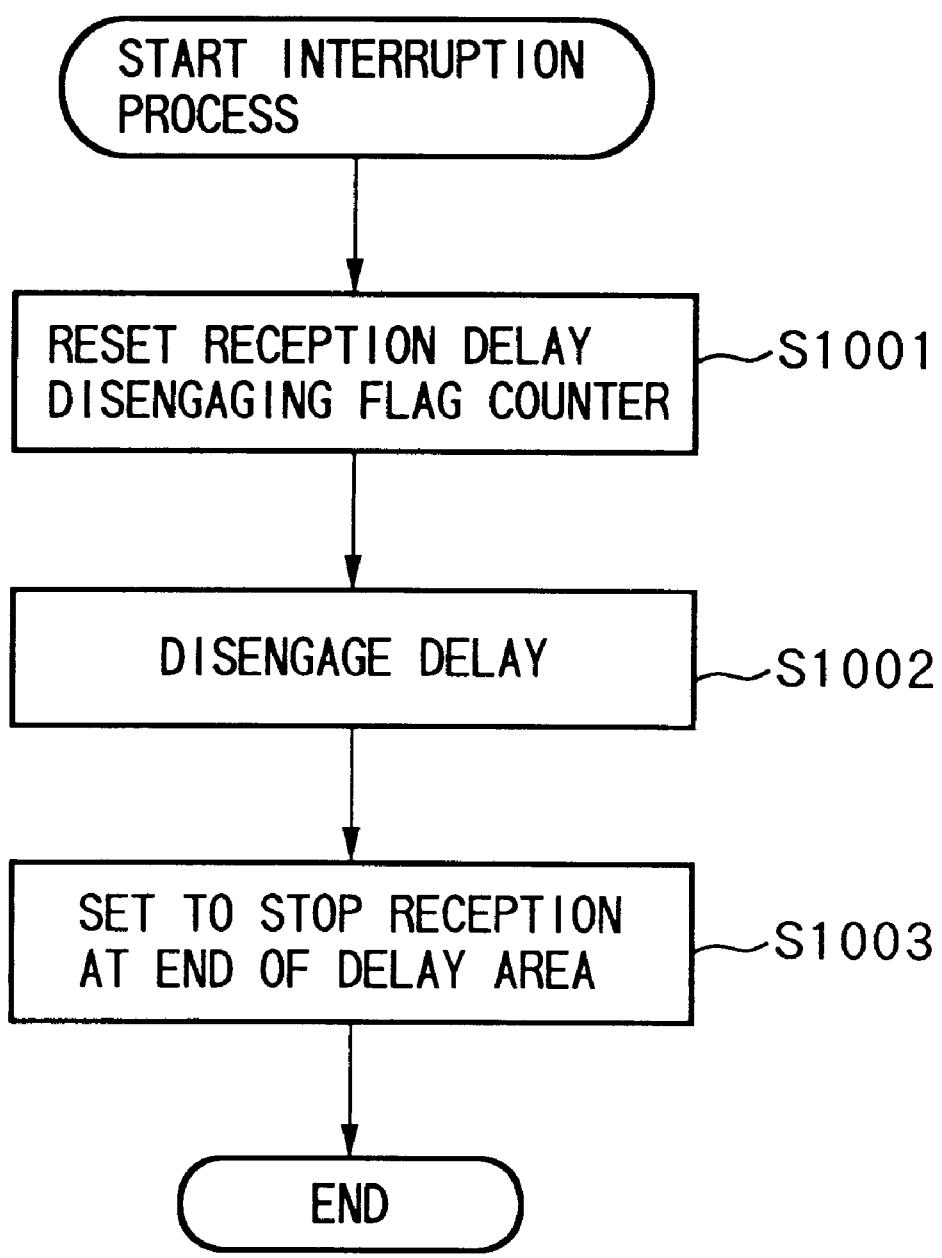
FIG. 24 is a flowchart illustrating the process for recovering from the delayed speed setting with the second embodiment of the present invention.

FIG. 24 is a flowchart showing the processing wherein the data within the reception buffer in the present variation reaches the delay area and reception delay begins, following which data processing from the CPU-P advances and the delay is disengaged. Data processing has proceeded to where there is sufficiently little data within the reception buffer, so the delay disengaging flag is cleared in Step 1001, and the counter of the time measurement is also cleared. The delay is disengaged in Step 1002, and a setting is made in Step 1003 to stop reception at the end of the delay area.

Normally, unless data processing is stopped for long periods of time due to errors or the like, data reception is performed at normal speed, and even in the event that the delay operation is initiated, data processing proceeds and the above disengaging is conducted.

Also, in the event that reception data processing has stopped due to an error or the like, the delay is disengaged after measurement of a certain amount of time by cyclic monitoring. Then, once the cause of the error is removed and data processing is restarted, an interruption occurs at the point that the data within the buffer is sufficiently low, as with the case above, so the delay is disengaged, and setting is made so that reception of data to the stand-by area is stopped.

Incidentally, though terms such as "stand-by area" and "delay area" within the reception buffer are made regarding the above first embodiment and second embodiment and the variations thereof, these areas are not fixedly appropriated to the buffer. This is because the reception buffer is a ring buffer, so the empty space moves along with the read pointer and write pointer. The stand-by area and delay area also move along with the movement of these pointers.

Incidentally, the present invention may be applied to a system comprised of a plurality of devices (e.g., host computer, interface equipment, reader, printer, etc.), or to a free-standing device (e.g., photocopier, facsimile device, etc.).

Also, the objects of the present invention are achieved by supplying the system or devices with a recording medium in which software program code for realizing the aforementioned functions of the embodiments is stored, so that the functions are realized by the computer (or CPU or MPU) of the system or device reading and executing the program code stored in the storage medium.

In this case, the program code itself read from the recording medium realizes the functions of the above-described embodiments, and thus the storage medium storing the program code comprises the present invention.

Types of storage medium for supplying the computer code include but are not limited to: e.g., floppy disks, hard disks, optical discs, optical-magnetic disks, CD-ROMs, CD-Rs, magnetic tape, non-volatile memory cards, ROM, and so forth.

Also, executing the program code read by a computer not only realizes the above-described functions of the above-described embodiments, but the present invention also encompass cases in which an operating system or the like operating on the computer performs part or all of the actual processing and the above-described functions of the above-described embodiments are realized as the result of such processing.

Further, the present invention also encompasses cases in which the program code read from the storage medium is read into memory relating to a function expansion board inserted into the computer or to a function expansion unit connected to the computer, following which a CPU or the like provided to the function expansion board or function expansion unit performs part or all of the actual processing based on the instruction of the program code and the above-described functions of the above-described embodiments are realized as the result of such processing.

As described above, according to the interface device of the present invention, even if the host uses one FIFO for both transmission and reception, data transfer can be made between the printer and the host by means of constantly securing an area in the reception buffer wherein all of the data within the above FIFO can be received, hence securing bi-directional communication between the host device and interface device.

Hence, data to be sent from the printer device, e.g., error information, can be notified to the host. At this time, data transmission from the host can be temporarily stopped without loosing any data within the FIFO.

Further, control of the host is the same as with known arrangements, and the above advantages are obtained by control at the printing device, so a printer device can be provided which sufficiently makes use of the bi-directional functionality, even when combined with computers which are already on the market.

Also, since this technique does not violate already-existing protocols such as IEEE 1284, the same compatibility is maintained with the operations of the personal computers. That is, there is no need to change the operations of the personal computer to differentiate between connecting to a printer device which employs the present invention and connecting to a printer device which does not.

Also, the reception speed is lowered when the remaining amount in the reception buffer drop below a certain amount. Thus, processing of the received data advances, and buffer-file errors do not easily occur.

Further, following the host stopping transfer of data therefrom due to an error at the printer, the reception speed is set to the normal speed until the host completes sending all of the data within the FIFO. Accordingly, even in the event that an error occurs in the state in which the reception speed has been lowered, the time till notifying the host of the error information is not drawn out.

What is claimed is:

1. An interface device connected to a host device which transmits and receives data via a host buffer serving as both a transmission and reception buffer, said interface device comprising:

receiving means for receiving data transmitted by said host device;

a reception buffer for storing received data, said reception buffer having a stand-by area secured that has capacity equal to or greater than that of the host buffer of said host device; and control means for controlling said reception buffer so that said stand-by area is used, in the event that an abnormal state is detected.

2. The interface device according to claim 1, wherein said control means controls said reception buffer so that said stand-by area is used to prevent said host buffer which receives data representing the abnormal state from being filled.

3. The interface device according to claim 1, further comprising a sensor for detecting abnormal states.

4. The interface device according to claim 3, further comprising speed-lowering means for lowering the reception speed by said receiving means, wherein said control means lowers the reception speed in the event that an abnormal state is detected by said sensor.

5. The interface device according to claim 3, further comprising speed-lowering means for lowering the reception speed by said receiving means, wherein said control means lowers the reception speed in the event that an abnormal state is detected by said sensor and said reception buffer is full.

6. The interface device according to claim 1, wherein said receiving means exchanges with the host device signals conforming to IEEE 1284 stipulations.

7. The interface device according to claim 1, further comprising setting means for setting said stand-by capacity.

8. The interface device according to claim 1, further comprising speed-lowering means for lowering the reception speed by said receiving means, wherein said control means lowers the reception speed of data in the event that the available capacity o f said reception buffer is equal to or less than a certain value which is greater than said stand-by capacity, and restores the reception speed of data to the original speed in the event that data to be transmitted to said host device is generated.

9. The interface device according to claim 1, further comprising speed-lowering means for lowering the reception speed by said receiving means, wherein said control means lowers the reception speed of data in the event that the available capacity of said reception buffer is equal to or less than a certain value which is greater than said stand-by capacity, and restores the reception speed of data to the original speed after a certain amount of time elapses.

10. The interface device according to claim 8, wherein said certain value is the capacity regarding which can data can be received and stored at the delayed reception speed during the longest period during which said interface device cannot execute reception processing.

11. A printing device connected to a host device by means of an interface device according to any of the claims 1 through 10, wherein said printing device prints images based on the data received via said interface device.

12. A method for controlling an interface device which is connected to a host device, said method comprising the steps of:

sending and receiving data via a host buffer serving as both a transmission and reception buffer of the host device;

storing received data in a reception buffer of the interface device, said reception buffer having a stand-by area secured that has capacity equal to or greater than that of the host buffer of the host device; and controlling said reception buffer so that said stand-by area is used when an abnormal state is detected.

13. The method for controlling an interface device according to claim 12, wherein said reception buffer is controlled so that said stand-by area is used to prevent said host buffer which receives data representing the abnormal state from being filled.

14. The method for controlling an interface device according to claim 12, said interface device further comprising a sensor for detecting abnormal states.

15. The method for controlling an interface device according to claim 14, further comprising a step for lowering the reception speed in the event that an abnormal state is detected by said sensor.

16. The method for controlling an interface device according to claim 14, further comprising a step for lowering the reception speed in the event that an abnormal state is detected by said sensor and said reception buffer is full.

17. The method for controlling an interface device according to claim 12, wherein signals conforming to IEEE 1284 stipulations are exchanged with the host device.

18. The method for controlling an interface device according to claim 12, wherein the reception speed of data is lowered in the event that the available capacity of said reception buffer is equal to or less than a certain value which is greater than said stand-by capacity, and the reception speed of data is restored to the original speed in the event that data to be transmitted to said host device is generated.

19. The method for controlling an interface device according to claim 12, wherein the reception speed of data is lowered in the event that the available capacity of said reception buffer is equal to or less than a certain value which is greater than said stand-by capacity, and the reception speed of data is restored to the original speed after a certain amount of time elapses.

20. The method for controlling an interface device according to claim 19, wherein said certain value is the capacity regarding which can data can be received and stored at the delayed reception speed during the longest period during which said interface device cannot execute reception processing.

21. The interface device according to clam 1, wherein said abnormal state is a state where a printer cover is open, paper jam or ink exhaust.

* * * * *

UNITED STATES PATENT AND TRADEMARK OFFICE
CERTIFICATE OF CORRECTION

PATENT NO. : 6,311,237 B1
DATED : October 30, 2001
INVENTOR(S) : Noriyuki Suzuki et al.

It is certified that error appears in the above-identified patent and that said Letters Patent is hereby corrected as shown below:

Column 2,
Line 24, "rem-ining" should read -- remaining --.
Line 45, "an" should read -- a --.

Column 4,
Line 6, "can" (first occurrence) should be deleted.

Column 5,
Line 44, "no" should read -- not --.
Line 58, "executes" should read -- execute --.

Column 11,
Line 1, "he" should read -- the --.

Column 13,
Line 4, "(ROK" should read -- (ROM --.
Line 56, "(FLU)" should read -- (FPU) --.

Column 14,
Line 4, "tinier" should read -- timer --.

Column 20,
Line 43, "o f" should read -- of --.
Line 57, "can" should be deleted.

Column 22,
Line 20, "can" (first occurrence) should be deleted.

Signed and Sealed this

Ninth Day of April, 2002

Attest:

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.    : 6,311,237 B1
DATED         : October 30, 2001
INVENTOR(S)   : Noriyuki Suzuki et al.

It is certified that error appears in the above-identified patent and that said Letters Patent is hereby corrected as shown below:

<u>Title page,</u>
Item [22], Filing Date "Dec. 29, 1998" should read -- Dec. 22, 1998 --.

Signed and Sealed this

Fifteenth Day of October, 2002

*Attest:*

*Attesting Officer*

JAMES E. ROGAN
*Director of the United States Patent and Trademark Office*